United States Patent [19]
Tajima et al.

[11] Patent Number: 6,077,804
[45] Date of Patent: *Jun. 20, 2000

[54] OLEFIN POLYMERIZATION CATALYST AND PROCESS FOR PREPARING POLYOLEFINS

[75] Inventors: Yoshio Tajima, Yokohama; Naoki Kataoka, Kawasaki; Akira Sano, Tokyo; Kazuo Matsuura, Yokohama, all of Japan

[73] Assignee: Nippon Oil Company, Limited, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/858,120

[22] Filed: May 19, 1997

Related U.S. Application Data

[63] Continuation of application No. 08/506,788, Jul. 25, 1995, abandoned.

[30] Foreign Application Priority Data

Jul. 26, 1994 [JP] Japan .................................. 6-202663
Oct. 3, 1994 [JP] Japan .................................. 6-274144

[51] Int. Cl.$^7$ ...................................................... C08F 4/60
[52] U.S. Cl. ........................ 502/108; 502/117; 502/120; 526/124; 526/129
[58] Field of Search ................................. 502/108, 117, 502/120; 526/124, 129

[56] References Cited

U.S. PATENT DOCUMENTS

| | | | |
|---|---|---|---|
| 3,231,550 | 1/1966 | Manyik et al. | 526/153 |
| 4,363,746 | 12/1982 | Capshew | 526/124.5 |
| 4,897,455 | 1/1990 | Welborn | 526/129 |
| 5,079,205 | 1/1992 | Canich | 526/165 |
| 5,126,301 | 6/1992 | Tsutsui et al. | 526/129 |
| 5,208,302 | 5/1993 | Nakajo et al. | 526/165 |
| 5,387,567 | 2/1995 | Tajima et al. | 502/103 |
| 5,625,014 | 4/1997 | Kataoka et al. | 526/129 |

FOREIGN PATENT DOCUMENTS 61-108610 5/1986 Japan .

*Primary Examiner*—Bernard Lipman
*Attorney, Agent, or Firm*—Dilworth & Barrese

[57] ABSTRACT

According to the present invention, there are provided a catalyst and a process for the preparation of polyolefins having a relatively wide molecular weight distribution, good particle properties, a narrow composition distribution in copolymerization and a high molecular weight and being less sticky. The catalyst is prepared by contacting the following constituents (1) to (4) with one another:

(1) a compound represented by the general formula $Me^1R^1_p(OR^2)_qX_{4-p-q}$, where $Me^1$ is Zr, Ti or Hf, $R^1$ and $R^2$ are each independently a hydrocarbon group having 1 to 24 carbon atoms, X is a halogen atom, p and q are each an integer in the ranges of $0 \leq p \leq 4$ and $0 \leq q \leq 4$, provided $0 \leq p+q \leq 4$;

(2) a compound represented by the general formula $Me^2R^3_m(OR^4)_nX^2_{z-m-n}$, where $Me^2$ is a Group I–III element in the Periodic Table, $R^3$ and $R^4$ are each independently a hydrocarbon group having 1 to 24 carbon atoms, $X^2$ is a halogen atom or a hydrogen atom, provided when $X^2$ is a hydrogen atom, $Me^2$ is a Group III element in the Periodic Table, z is the valence of $Me^2$, m and n are each an integer in the ranges of $0 \leq m \leq z$, and $0 \leq n \leq z$, provided $0 \leq m+n \leq z$;

(3) an organocyclic compound having conjugated double bonds; and (4) a modified organoaluminum compound containing Al—O—Al bond, and thereafter contacting the resulting contact reaction product with the following component (5):

(5) an inorganic carrier and/or a particulate polymer carrier.

23 Claims, No Drawings

OLEFIN POLYMERIZATION CATALYST AND PROCESS FOR PREPARING POLYOLEFINS

This is a continuation of application Ser. No. 08/506,788 filed on Jul. 25, 1995 now abandoned.

BACKGROUND OF THE INVENTION

The present invention relates to an olefin polymerization catalyst and a process for preparing a polyolefin by homopolymerizing or copolymerizing an olefin or olefins in the presence of the catalyst, the polyolefin having a relatively wide molecular weight distribution, good particle properties, a narrow composition distribution in copolymerization and a high molecular weight and being less sticky.

It is known in JP58-19309A to use a catalyst comprising a zirconium compound (typically a metallocene compound) and an aluminoxane in the preparation of a polyolefin, especially an ethylene homopolymer or an ethylene/α-olefin copolymer. This technique is advantageous in that ethylene copolymers can be produced in high yield, but disadvantageous in that the said copolymers are narrow in both molecular weight distribution and composition distribution and low in molecular weight.

If only the molecular weight of the resulting polymer is to be enhanced, this purpose can be attained to some extent by selecting a suitable transition metal compound in the metallocene as one component of the catalyst. For Example, with a view to improving the molecular weight of the resulting polymer, JP63-234005A proposes the use of a transition metal compound having a 2, 3 and 4-substituted cyclopentadienyl group, and JP2-22307A proposes the use of a hafnium compound having a ligand bonded to at least two crosslinked, conjugated cycloalkadienyl groups.

However, the route and operation for preparing such catalyst components are complicated, and the use of hafnium as a transition metal is disadvantageous in that the yield (based on the catalyst used) of the resulting polymer is low. Besides, the conventional catalysts exemplified above are often soluble in the reaction system, so when used in slurry polymerization or vapor phase polymerization, there arises a problem such that the resulting polymer is extremely low in bulk density and inferior in particle properties.

Having made earnest studies for overcoming the above-mentioned problems of the prior art, the present inventors found out that a polyolefin serving a desired purpose, namely a polyolefin having a high molecular weight, a relatively wide molecular weight distribution, a narrow composition distribution and excellent particle properties could be obtained by using a novel catalyst system quite different in construction from conventional catalyst systems (JP5-132518A).

It is the object of the present invention to attain a further improvement, particularly to provide an olefin polymerization catalyst and a polyolefin preparing process using the catalyst which is extremely advantageous from the standpoint of productivity and which, in comparison with the prior art, uses a catalyst high in polymerization activity, especially in its activity at an early stage of polymerization, and affords a polyolefin superior in particle properties such as being high in bulk density, the polyolefin being substantially not deposited on a stirrer mounted in the reactor or on the inner wall of the reactor.

SUMMARY OF THE INVENTION

In one aspect, the present invention resides in an olefin polymerization catalyst, which catalyst is prepared by contacting the following constituents (1) to (4) with one another:

(1) a compound represented by the general formula $Me^1R^1_p(OR^2)_qX_{4-p-q}$ where $Me^1$ is Zr, Ti or Hf, $R^1$ and $R^2$ are each independently a hydrocarbon group having 1 to 24 carbon atoms, X is a halogen atom, p and q are each an integer in the ranges of $0 \leq p \leq 4$ and $0 \leq q \leq 4$, provided $0 \leq p+q \leq 4$;

(2) a compound represented by the general formula $Me^2R^3_m(OR^4)_nX^2_{z-m-n}$ where $Me^2$ is a Group I–III element in the Periodic Table, $R^3$ and $R^4$ are each independently a hydrocarbon group having 1 to 24 carbon atoms, $X^2$ is a halogen atom or a hydrogen atom, provided when $X^2$ is a hydrogen atom, $Me^2$ is a Group III element in the Periodic Table, z is the valence of $Me^2$, m and n are each an integer in the ranges of $0 \leq m \leq z$, and $0 \leq n \leq z$, provided $0 \leq m+n \leq z$;

(3) an organocyclic compound having conjugated double bonds; and (4) a modified organoaluminum compound containing Al—O—Al bond, and thereafter contacting the resulting contact reaction product with the following component (5):

(5) an inorganic carrier and/or a particulate polymer carrier.

In another aspect, the present invention resides in a process for preparing a polyolefin which comprises homopolymerizing or copolymerizing one or more olefins in the presence of the catalyst as prepared above.

The present invention has many industrial advantages. For example, the catalyst used can be prepared relatively easily. The activity of the catalyst per transition metal and an initial polymerization activity thereof are high, thus permitting a highly efficient preparation of a polyolefin. Besides, the resulting polyolefin is high in molecular weight and relatively wide in molecular weight distribution. Particularly, when the resulting polymer is an ethylene/α-olefin copolymer, its composition distribution is narrow and the copolymer exhibits little surface stickiness and has good particle properties such as high bulk density.

DETAILED DESCRIPTION OF THE INVENTION

The present invention will be described in more detail hereinunder.

As mentioned above, the catalyst in accordance with the present invention is obtained by contacting the following constituents (1) to (4) with one another:

(1) a compound of the general formula $Me^1R^1_p(OR^2)_qX^1_{4-p-q}$ (2) a compound of the general formula $Me^2R^3_m(OR^4)_nX^2_{z-m-n}$ (3) an organocyclic compound having conjugated double bonds; and (4) a modified organoaluminum compound containing Al—O—Al bond, and thereafter contacting the resulting contact reaction product with the following component (5):

(5) an inorganic carrier and/or a particulate polymer carrier.

Usually, the catalyst is substantiually solid.

Reference will first be made to constituent (1), namely, a compound of the general formula $Me^1R^1_p(OR^2)_qX^1_{4-p-q}$. $R^1$ and $R^2$ in this formula are each independently a hydrocarbon group having 1 to 14, preferably 1 to 12, more preferably 1 to 8, carbon atoms. As examples of such hydrocarbon group are mentioned alkyl groups such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, tolyl, xylyl, mesityl, indenyl and naphthyl, and aralkyl groups such as benzyl, trityl, phenetyl, styryl, benzhydryl, phenylbutyl, phenylpropyl and neophyl. These groups may have branches. Further, in the above formula, $X^1$ is a halogen atom selected from fluorine, iodine, chlorine and bromine, $Me^1$ is Zr, Ti or Hf, preferably Zr, and p and q are in the ranges of $0 \leq p \leq 4$ and $0 \leq q \leq 4$, provided $0 \leq p+q \leq 4$, preferably $0 < p+q \leq 4$.

Suitable examples of constituent (1) include tetramethylzirconium, tetraethylzirconium, tetrapropylzirconium, tetra-n-butylzirconium, tetrapentylzirconium, tetraphenylzirconium, tetratolylzirconium, tetrabenzylzirconium, tetraallylzirconium, tetraneophylzirconium, tetramethoxyzirconium, tetraethoxyzirconium, tetrapropoxyzirconium, tetrabutoxyzirconium, tetrapentyloxyzirconium, tetraphenoxyzirconium, tetratolyloxyzirconium, tetrabenzyloxyzirconium, tetraallyloxyzirconium, tetraallyloxyzirconium, tetraneophyloxyzirconium, trimethylmonochlorozirconium, triethylmonochlorozirconium, tripropylmonochlorozirconium, tri-n-butylmonochlorozirconium, tripentylmonochlorozirconium, triphenylmonochlorozirconium, tritolylmonochlorozirconium, tribenzylmonochlorozirconium, triallylmonochlorozirconium, trineophylmonochlorozirconium, dimethyldichlorozirconium, diethyldichlorozirconium, dipropyldichlorozirconium, di-n-butyldichlorozirconium, dipentyldichlorozirconium, diphenyldichlorozirconium, ditolyldichlorozirconium, dibenzyldichlorozirconium, diallyldichlorozirconium, dineophyldichlorozirconium, monomethyltrichlorozirconium, monoethyltrichlorozirconium, monopropyltrichlorozirconium, mono-n-butyltrichlorozirconium, monopentyltrichlorozirconium, monophenyltrichlorozirconium, monotolyltrichlorozirconium, monobenzyltrichlorozirconium, monoallyltrichlorozirconium, mononeophyltrichlorozirconium, tetrachlorozirconium, trimethoxymonochlorozirconium, dimethoxydichlorozirconium, monomethoxytrichlorozirconium, triethoxymonochlorozirconium, diethoxydichlorozirconium, monoethoxytrichlorozirconium, tripropylmonochlorozirconium, dipropyldichlorozirconium, monopropyltrichlorozirconium, tri-n-butoxymonochlorozirconium, di-n-butoxydichlorozirconium, mono-n-butoxytrichlorozirconium, tripentyloxymonochlorozirconium, dipentyloxydichlorozirconium, monopentyloxytrichlorozirconium, triphenoxymonochlorozirconium, diphenoxydichlorozirconium, monophenoxytrichlorozirconium, tritolyloxymonochlorozirconium, ditolyloxydichlorozirconium, monotolyloxytrichlorozirconium, tribenzyloxymonochlorozirconium, dibenzyloxydichlorozirconium, monobenzyloxytrichlorozirconium, triallyloxymonochlorozirconium, diallyloxydichlorozirconium, monoallyloxytrichlorozirconium, trineophyloxymonochlorozirconium, dineophyloxydichlorozirconium, mononeophyloxytrichlorozirconium, tetrabromozirconium, trimethylmonobromozirconium, triethylmonobromozirconium, tripropylmonobromozirconium, tri-n-butylmonobromozirconium, tripentylmonobromozirconium, triphenylmonobromozirconium, tritolylmonobromozirconium, tribenzylmonobromozirconium, triallylmonobromozirconium, trineophylmonobromozirconium, dimethyldibromozirconium, diethyldibromozirconium, dipropyldibromozirconium, di-n-butyldibromozirconium, dipentyldibromozirconium, diphenyldibromozirconium, ditolyldibromozirconium, dibenzyldibromozirconium, diallyldibromozirconium, dineophyldibromozirconium, monomethyltribromozirconium, monoethyltribromozirconium, monopropyltribromozirconium, mono-n-butyltribromozirconium, monopentyltribromozirconium, monophenyltribromozirconium, monotolyltribromozirconium, monobenzyltribromozirconium, monoallyltribromozirconium, mononeophyltribromozirconium, trimethoxymonobromozirconium, dimethoxydibromozirconium, monomethoxytribromozirconium, triethoxymonobromozirconium, diethoxydibromozirconium, monoethoxytribromozirconium, tripropoxymonobromozirconium, dipropoxydibromozirconium, monopropoxytribromozirconium, tri-n-butoxymonobromozirconium, di-n-butoxydibromozirconium, mono-n-butoxytribromozirconium, tripentyloxymonobromozirconium, dipentyloxydibromozirconium, monopentyloxytribromozirconium, triphenoxymonobromozirconium, diphenoxydibromozirconium, monophenoxytribromozirconium, tritolyloxymonobromozirconium, ditolyloxydibromozirconium, monotolyloxytribromozirconium, tribenzyloxymonobromozirconium, dibenzyloxydibromozirconium, monobenzyloxytribromozirconium, triallyloxymonobromozirconium, diallyloxydibromozirconium, monoallyloxytribromozirconium, trineophyloxymonobromozirconium, dineophyloxydibromozirconium, mononeophyloxytribromozirconium, tetraiodozirconium, trimethylmonoiodozirconium, triethylmonoiodozirconium, tripropylmonoiodozirconium, tri-n-butylmonoiodozirconium, tripentylmonoiodozirconium, triphenylmonoiodozirconium, tritolylmonoiodozirconium, tribenzylmonoiodozirconium, triallylmonoiodozirconium, trineophylmonoiodozirconium, dimethyldiiodozirconium, diethyldiiodozirconium, dipropyldiiodozirconium, di-n-butyldiiodozirconium, dipentyldiiodozirconium, diphenyldiiodozirconium, ditolyldiiodozirconium, dibenzyldiiodozirconium, diallyldiiodozirconium, dineophyldiiodozirconium, monomethyltriiodozirconium, monoethyltriiodozirconium, monopropyltriiodozirconium, mono-n-butyltriiodozirconium, monopentyltriiodozirconium, monophenyltriiodozirconium, monotolyltriiodozirconium, monobenzyltriiodozirconium, trimethoxymonoiodozirconium, dimethoxydiiodozirconium, monomethoxytriiodozirconium, triethoxymonoiodozirconium, diethoxydiiodozirconium, monoethoxytriiodozirconium, tripropoxymonoiodozirconium, dipropoxydiiodozirconium, monopropoxytriiodozirconium, tri-n-butoxymonoiodozirconium, di-n-butoxydiiodozirconium, mono-n-butoxytriiodozirconium, tripentyloxymonoiodozirconium, dipentyloxydiiodozirconium, monopentyloxytriiodozirconium, triphenoxymonoiodozirconium, diphenoxydiiodozirconium, monophenoxytriiodozirconium, tritolyloxymonoiodozirconium, ditolyloxydiiodozirconium, monotolyloxytriiodozirconium, tribenzyloxymonoiodozirconium, dibenzyloxydiiodozirconium, monobenzyloxytriiodozirconium, triallyloxymonoiodozirconium, diallyloxydiiodozirconium, monoallyloxytriiodozirconium, trineophyloxymonoiodozirconium, dineophyloxydiiodozirconium, mononeophyloxytriiodozirconium, tribenzylmonomethoxyzirconium, tribenzylmonoethoxyzirconium, tribenzylmonopropoxyzirconium, tribenzylmonobutoxyzirconium, tribenzylmonopentyloxyzirconium, tribenzylmonophenoxyzirconium, tribenzylmonotolyloxyzirconium, tribenzylmonobenzyloxyzirconium, tribenzylmonoallyloxyzirconium, tribenzylmononeophyloxyzirconium, dibenzyldimethoxyzirconium, dibenzyldiethoxyzirconium, dibenzyldipropoxyzirconium, dibenzyldibutoxyzirconium, dibenzyldipentyloxyzirconium, dibenzyldiphenoxyzirconium, dibenzylditolyloxyzirconium, dibenzyldibenzyloxyzirconium, dibenzyldiallyloxyzirconium, dibenzyldineophyloxyzirconium, monobenzyltrimethoxyzirconium, monobenzyltriethoxyzirconium, monobenzyltripropoxyzirconium, monobenzylmonobutoxyzirconium, monobenzyltripentyloxyzirconium, monobenzyltriphenoxyzirconium, monobenzyltritolyloxyzirconium, monobenzyltribenzyloxyzirconium, monobenzyltriallyloxyzirconium, monobenzyltrineophyloxyzirconium, trineophylmonomethoxyzirconium, trineophylmonoethoxyzirconium, trineophylmonopropoxyzirconium, trineophylmonobutoxyzirconium, trineophylmonophenoxyzirconium, dineophyldimethoxyzirconium, dineophyldiethoxyzirconium, dineophyldipropoxyzirconium, dineophyldibutoxyzirconium, dineophyldiphenoxyzirconium, mononeophyltrimethoxyzirconium, mononeophyltriethoxyzirconium, mononeophyltripropoxyzirconium, mononeophyltributoxyzirconium, mononeophyltriphenoxyzirconium, tetramethyltitanium, tetraethyltitanium, tetrapropyltitanium, tetra-n-butyltitanium, tetrapentyltitanium, tetraphenyltitanium, tetratolyltitanium, tetrabenzyltitanium, tetraallyltitanium, tetraneophyltitanium, tetramethoxytitanium, tetraethoxytitanium, tetrapropoxytitanium, tetrabutoxytitanium, tetrapentyloxytitanium, tetraphenoxytitanium, tetratolyloxytitanium, tetrabenzyloxytitanium, tetraallyloxytitanium, tetraneophyloxytitanium, trimethylmonochlorotitanium, triethylmonochlorotitanium, tripropylmonochlorotitanium, tri-n-butylmonochlorotitanium, tribenzylmonochlorotitanium, dimethyldichlorotitanium, diethyldichlorotitanium, di-n-butyldichlorotitanium, dibenzyldichlorotitanium, monomethyltrichlorotitanium, monoethyltrichlorotitanium, mono-n-butyltrichlorotitanium, monobenzyltrichlorotitanium, monoallyltrichlorotitanium, mononeophyltrichlorotitanium, tetrachlorotitanium, trimethoxymonochlorotitanium, dimethoxydichlorotitanium, monomethoxytrichlorotitanium, triethoxymonochlorotitanium, diethoxydichlorotitanium, monoethoxytrichlorotitanium, tripropoxymonochlorotitanium, dipropyldichlorotitanium, monopropyltrichlorotitanium, tri-n-butoxymonochlorotitanium, di-n-butoxydichlorotitanium, mono-n-butoxytrichlorotitanium, tripentyloxymonochlorotitanium, dipentyloxydichlorotitanium, monopentyloxytrichlorotitanium, triphenoxymonochlorotitanium, diphenoxydichlorotitanium, monophenoxytrichlorotitanium, tritolyloxymonochlorotitanium, ditolyloxydichlorotitanium, monotolyloxytrichlorotitanium, tribenzyloxymonochlorotitanium, dibenzyloxydichlorotitanium, monobenzyloxytrichlorotitanium, tetrabromotitanium, trimethylmonobromotitanium, triethylmonobromotitanium, tripropylmonobromotitanium, tri-n-butylmonobromotitanium, tribenzylmonobromotitanium, dimethyldibromotitanium, diethyldibromotitanium, di-n-butyldibromotitanium, dibenzyldibromotitanium, monomethyltribromotitanium, monoethyltribromotitanium, mono-n-butyltribromotitanium, monobenzyltribromotitanium, trimethoxymonobromotitanium, dimethoxydibromotitanium, monomethoxytribromotitanium, triethoxymonobromotitanium, diethoxydibromotitanium, monoethoxytribromotitanium, tripropoxymonobromotitanium, dipropoxydibromotitanium, monopropoxytribromotitanium, tri-n-butoxymonobromotitanium, di-n-butoxydibromotitanium, mono-n-butoxytribromotitanium, tripentyloxymonobromotitanium, dipentyloxydibromotitanium, monopentyloxytribromotitanium, triphenoxymonobromotitanium, diphenoxydibromotitanium, monophenoxytribromotitanium, tritolyloxymonobromotitanium, ditolyloxydibromotitanium, monotolyloxytribromotitanium, tribenzyloxymonobromotitanium, dibenzyloxydibromotitanium, monobenzyloxytribromotitanium, tetraiodotitanium, trimethylmonoiodotitanium, triethylmonoiodotitanium, tripropylmonoiodotitanium, tri-n-butylmonoiodotitanium, tribenzylmonoiodotitanium, dimethyldiiodotitanium, diethyldiiodotitanium, di-n-butyldiiodotitanium, dibenzyldiiodotitanium, monomethyltriiodotitanium, monoethyltriiodotitanium, mono-n-butyltriiodotitanium, monobenzyltriiodotitanium, trimethoxymonoiodotitanium, dimethoxydiiodotitanium, monomethoxytriiodotitanium, triethoxymonoiodotitanium, diethoxydiiodotitanium, monoethoxytriiodotitanium, tripropoxymonoiodotitanium, dipropoxydiiodotitanium, monopropoxytriiodotitanium, tri-n-butoxymonoiodotitanium, di-n-butoxydiiodotitanium, mono-n-butoxytriiodotitanium, tripentyloxymonoiodotitanium, dipentyloxydiiodotitanium, monopentyloxytriiodotitanium, triphenoxymonoiodotitanium, diphenoxydiiodotitanium, monophenoxytriiodotitanium, tritolyloxymonoiodotitanium, ditolyloxydiiodotitanium, monotolyloxytriiodotitanium, tribenzyloxymonoiodotitanium, dibenzyloxydiiodotitanium, monobenzyloxytriiodotitanium, tribenzylmonomethoxytitanium, tribenzylmonoethoxytitanium, tribenzylmonopropoxytitanium, tribenzylmonobutoxytitanium, tribenzylmonophenoxytitanium, dibenzyldimethoxytitanium, dibenzyldiethoxytitanium, dibenzyldipropoxytitanium, dibenzyldibutoxytitanium, dibenzyldiphenoxytitanium, monobenzyltrimethoxytitanium, monobenzyltriethoxytitanium, monobenzyltripropoxytitanium, monobenzyltributoxytitanium, monobenzyltriphenoxytitanium, trineophylmonomethoxytitanium, trineophylmonoethoxytitanium, trineophylmonopropoxytitanium, trineophylmonobutoxytitanium, trineophylmonophenoxytitanium, dineophyldimethoxytitanium, dineophyldiethoxytitanium, dineophyldipropoxytitanium, dineophyldibutoxytitanium, dineophyldiphenoxytitanium, mononeophyltrimethoxytitanium, mononeophyltriethoxytitanium, mononeophyltripropoxytitanium, mononeophyltributoxytitanium, mononeophyltriphenoxytitanium, tetramethylhafnium, tetraethylhafnium, tetrapropylhafnium, tetra-n-butylhafnium, tetrapentylhafnium, tetraphenylhafnium, tetratolylhafnium, tetrabenzylhafnium, tetraallylhafnium, tetraneophylhafnium, tetramethoxyhafnium, tetraethoxyhafnium, tetrapropoxyhafnium, tetrabutoxyhafnium, tetrapentyloxyhafnium, tetraphenoxyhafnium, tetratolyloxyhafnium, tetrabenzyloxyhafnium, tetraallyloxyhafnium, tetraneophyloxyhafnium, trimethylmonochlorohafnium, triethylmonochlorohafnium, tripropylmonochlorohafnium, tri-n-butylmonochlorohafnium, tribenzylmonochlorohafnium, dimethyldichlorohafnium, diethyldichlorohafnium, di-n-butyldichlorohafnium, dibenzyldichlorohafnium, monomethyltrichlorohafnium, monoethyltrichlorohafnium, mono-n-butyltrichlorohafnium, monobenzyltrichlorohafnium, tetrachlorohafnium, trimethoxymonochlorohafnium, dimethoxydichlorohafnium, monomethoxytrichlorohafnium, triethoxymonochlorohafnium, diethoxydichlorohafnium, monoethoxytrichlorohafnium, tripropoxymonochlorohafnium, dipropoxydichlorohafnium, monopropoxytrichlorohafnium, tri-n-butoxymonochlorohafnium, di-n-butoxydichlorohafnium, mono-n-butoxytrichlorohafnium, tripentyloxymonochlorohafnium, dipentyloxydichlorohafnium, monopentyloxytrichlorohafnium, triphenoxymonochlorohafnium, diphenoxydichlorohafnium, monophenoxytrichlorohafnium, tritolyloxymonochlorohafnium, ditolyloxydichlorohafnium, monotolyloxytrichlorohafnium, tribenzyloxymonochlorohafnium, dibenzyloxydichlorohafnium, monobenzyloxytrichlorohafnium, tetrabromohafnium, trimethylmonobromohafnium, triethylmonobromohafnium, tripropylmonobromohafnium, tri-n-butylmonobromohafnium, tribenzylmonobromohafnium, dimethyldibromohafnium, diethyldibromohafnium, di-n-butyldibromohafnium, dibenzyldibromohafnium, monomethyltribromohafnium, monoethyltribromohafnium, mono-n-butyltribromohafnium, monobenzyltribromohafnium, trimethoxymonobromohafnium, dimethoxydibromohafnium, monomethoxytribromohafnium, triethoxymonobromohafnium, diethoxydibromohafnium, monoethoxytribromohafnium, tripropoxymonobromohafnium, dipropoxydibromohafnium, monopropoxytribromohafnium, tri-n-butoxymonobromohafnium, di-n-butoxydibromohafnium, mono-n-butoxytribromohafnium, tripentyloxymonobromohafnium, dipentyloxydibromohafnium, monopentyloxytribromohafnium, triphenoxymonobromohafnium, diethoxydibromohafnium, monophenoxytribromohafnium, tritolyloxymonobromohafnium, ditolyloxydibromohafnium, monotolyloxytribromohafnium, tribenzyloxymonobromohafnium, dibenzyloxydibromohafnium, monobenzyloxytribromohafnium, tetraiodohafnium, trimethylmonoiodohafnium, triethylmonoiodohafnium, tripropylmonoiodohafnium, tri-n-butylmonoiodohafnium, tribenzylmonoiodohafnium, dimethyldiiodohafnium, diethyldiiodohafnium, di-n-butyldiiodohafnium, dibenzyldiiodohafnium, monomethyltriiodohafnium, monoethyltriiodohafnium, mono-n-butyltriiodohafnium, monobenzyltriiodohafnium, trimethoxymonoiodohafnium, dimethoxydiiodohafnium, monomethoxytriiodohafnium, triethoxymonoiodohafnium, diethoxydiiodohafnium, monoethoxytriiodohafnium, tripropoxymonoiodohafnium, dipropoxydiiodohafnium, monopropoxytriiodohafnium, tri-n-butoxymonoiodohafnium, di-n-butoxydiiodohafnium, mono-n-butoxytriiodohafnium, tripentyloxymonoiodohafnium, dipentyloxydiiodohafnium, monopentyloxytriiodohafnium, triphenoxymonoiodohafnium, diphenoxydiiodohafnium, monophenoxytriiodohafnium, tritolyloxymonoiodohafnium, ditolyloxydiiodohafnium, monotolyloxytriiodohafnium, tribenzyloxymonoiodohafnium, dibenzyloxydiiodohafnium, monobenzyloxytriiodohafnium,
tribenzylmonomethoxyhafnium,
tribenzylmonoethoxyhafnium,
tribenzylmonopropoxyhafnium,
tribenzylmonobutoxyhafnium,
tribenzylmonophenoxyhafnium,
dibenzyldimethoxyhafnium, dibenzyldiethoxyhafnium,
dibenzyldipropoxyhafnium, dibenzyldibutoxyhafnium,
dibenzyldiphenoxyhafnium,
monobenzyltrimethoxyhafnium,
monobenzyltriethoxyhafnium,
monobenzyltripropoxyhafnium,
monobenzyltributoxyhafnium,
monobenzyltriphenoxyhafnium,
trineophylmonomethoxyhafnium,
trineophylmonoethoxyhafnium,
trineophylmonopropoxyhafnium,
trineophylmonobutoxyhafnium,
trineophylmonophenoxyhafnium,
dineophyldimethoxyhafnium, dineophyldiethoxyhafnium,
dineophyldipropoxyhafnium, dineophyldibutoxyhafnium,
dineophyldiphenoxyhafnium,
mononeophyltrimethoxyhafnium,
mononeophyltriethoxyhafnium,
mononeophyltripropoxyhafnium,
mononeophyltributoxyhafnium, and mononeophyltriphenoxyhafnium.

It goes without saying that in the compounds reffered to above as examples of constituent (1) there is included not only the case where $R^1$ and $R^2$ in the general formula concerned are n- groups but also the case where they are isomeric groups of various structures such as iso-, s-, t- and neo-.

Among the compounds exemplified above, tetramethylzirconium, tetraethylzirconium, tetrabenzylzirconium, tetrapropoxyzirconium, tripropoxymonochlorozirconium, tetrabutoxyzirconium, tetrabutoxytitanium, and tetrabutoxyhafnium are preferred. Particularly preferred are the compounds represented by the formula $Zr(OR)_4$, including tetrapropoxyzirconium and tetrabutoxyzirconium. These compounds may be used as a mixture of two or more.

The following description is now provided about constituent (2), namely, a compounds of the general formula $Me^2R^3_m(OR^4)_nX^2_{z-m-n}$. $Me^2$ is a Group I–III element in the Periodic Table. Examples are mentioned lithium, sodium, potassium, magnesium, calcium, zinc, boron and aluminum. $R^3$ and $R^4$ are each independently a hydrocarbon group having 1 to 24, preferably 1–12, more preferably 1–8, carbon atoms.

As examples are mentioned alkyl groups such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, tolyl, xylyl, mesityl, indenyl and naphthyl, and aralkyl groups such as benzyl, trityl, phenetyl, styryl, benzhydryl, phenylbutyl, phenylpropyl and neophyl. These groups may have branches. Further, in the above formula, $X^2$ is a halogen atom such as fluorine, iodine, chlorine or bromine or hydrogen atom, provided when $X^2$ is a hydrogen atom, $Me^2$ is limited to a Group III element such as boron or aluminum. z is the valence of $Me^2$, m is $0 \leq m \leq z$, n is $0 \leq n \leq z$, provided $0 \leq m+n \leq z$, preferably $0 < m+n \leq z$, preferably they are each an integer.

Suitable examples of constituent (2) include methyllithium, ethyllithium, propyllithium, isopropyllithium, butyllithium, t-butyllithium, pentyllithium, octyllithium, phenyllithium, benzyllithium, dimethylmagnesium, diethylmagnesium, di-n-propylmagnesium, diisopropylmagnesium, dibutylmagnesium, di-t-butylmagnesium, dipentylmagnesium, dioctylmagnesium, diphenylmagnesium, dibenzylmagnesium, methylmagnesium chloride, ethylmagnesium chloride, propylmagnesium chloride, isopropylmagnesium chloride, butylmagnesium chloride, t-butylmagnesium chloride, pentylmagnesium chloride, octylmagnesium chloride, phenylmagnesium chloride, benzylmagnesium chloride, methylmagnesium bromide, methylmagnesium iodide, ethylmagnesium bromide, ethylmagnesium iodide, propylmagnesium bromide, propylmagnesium iodide, isopropylmagnesium bromide, isopropylmagnesium iodide, butylmagnesium bromide, butylmagnesium iodide, t-butylmagnesium bromide, t-butylmagnesium iodide, pentylmagnesium bromide, pentylmagnesium iodide, octylmagnesium bromide, octylmagnesium iodide, phenylmagnesium bromide, phenylmagnesium iodide, benzylmagnesium bromide, benzylmagnesium iodide, dimethylzinc, diethylzinc, dipropylzinc, diisopropylzinc, di-n-butylzinc, di-t-butylzinc, dipentylzinc, dioctylzinc, diphenylzinc, dibenzylzinc, trimethylboron, triethylboron, tripropylboron, triisopropylboron, tributylboron, tri-t-butylboron, tripentylboron, trioctylboron, triphenylboron, tribenzylboron, trimethylaluminum, triethylaluminum, diethylaluminum chloride, diethylaluminum bromide, diethylaluminum fluoride, diethylaluminum iodide, ethylaluminum dichloride, ethylaluminum dibromide, ethylaluminum difluoride, ethylaluminum diiodide, tripropylaluminum, dipropylaluminum chloride, dipropylaluminum bromide, dipropylaluminum fluoride, dipropylaluminum iodide, propylaluminum dichloride, propylaluminum dibromide, propylaluminum difluoride, propylaluminum diiodide, triisopropylaluminum, diisopropylaluminum chloride, diisopropylaluminum bromide, diisopropylaluminum fluoride, diisopropylaluminum iodide, ethylaluminum sesquichloride, ethylaluminum sesquibromide, propylaluminum sesquichloride, propylaluminum sesquibromide, butylaluminum sesquichloride, butylaluminum sesquibromide, isopropylaluminum sesquichloride, isopropylaluminum dibromide, isopropylaluminum difluoride, isopropylaluminum diiodide, tributylaluminum, dibutylaluminum chloride, dibutylaluminum bromide, dibutylaluminum fluoride, dibutylaluminum iodide, butylaluminum dichloride, butylaluminum dibromide, butylaluminum difluoride, butylaluminum diiodide, tri-sec-butylaluminum, di-sec-butylaluminum chloride, di-sec-butylaluminum bromide, di-sec-butylaluminum fluoride, di-sec-butylaluminum iodide, sec-butylaluminum dichloride, sec-butylaluminum dibromide, sec-butylaluminum difluoride, sec-butylaluminum diiodide, tri-tert-butylaluminum, di-tert-butylaluminum chloride, di-tert-butylaluminum bromide, di-tert-butylaluminum fluoride, di-tert-butylaluminum iodide, tert-butylaluminum dichloride, tert-butylaluminum dibromide, tert-butylaluminum difluoride, tert-butylaluminum diiodide, triisobutylaluminum, diisobutylaluminum chloride, diisobutylaluminum bromide, diisobutylaluminum fluoride, diisobutylaluminum iodide, isobutylaluminum dichloride, isobutylaluminum dibromide, isobutylaluminum difluoride, isobutylaluminum diiodide, trihexylaluminum, dihexylaluminum chloride, dihexylaluminum bromide, dihexylaluminum fluoride, dihexylaluminum iodide, hexylaluminum dichloride, hexylaluminum dibromide, hexylaluminum difluoride, hexylaluminum diiodide, tripentylaluminum, dipentylaluminum chloride, dipentylaluminum bromide, dipentylaluminum fluoride, dipentylaluminum iodide, pentylaluminum dichloride, pentylaluminum dibromide, pentylaluminum difluoride, pentylaluminum diiodide, methylaluminum methoxide, methylaluminum ethoxide, methylaluminum propoxide, methylaluminum butoxide, dimethylaluminum methoxide, dimethylaluminum ethoxide, dimethylaluminum propoxide, dimethylaluminum butoxide, ethylaluminum methoxide, ethylaluminum ethoxide, ethylaluminum propoxide, ethylaluminum butoxide, diethylaluminum methoxide, diethylaluminum ethoxide, diethylaluminum propoxide, diethylaluminum butoxide, propylaluminum methoxide, propylaluminum ethoxide, propylaluminum propoxide, propylaluminum butoxide, dipropylaluminum methoxide, dipropylaluminum ethoxide, dipropylaluminum propoxide, dipropylaluminum butoxide, butylaluminum methoxide, butylaluminum ethoxide, butylaluminum propoxide, butylaluminum butoxide, dibutylaluminum methoxide, dibutylaluminum ethoxide, dibutylaluminum propoxide, dibutylaluminum butoxide, aluminum hydride, dimethylaluminum hydride, diethylaluminum hydride, dipropylaluminum hydride, di-iso-propylaluminum hydride, dibutylaluminum hydride, di-iso-butylaluminum hydride, dihexylaluminum hydride, dicyclohexylaluminum hydride, methylaluminum dihydride, ethylaluminum dihydride, propylaluminum dihydride, isopropylaluminum dihydride, butylaluminum dihydride, isobutylaluminum dihydride, hexylaluminum dihydride, cyclohexylaluminum dihydride, boron, dimethylboron hydride, diethylboron hydride, methylboron dihydride, ethylboron dihydride and diboron.

As constituent (3) there is used an organocyclic compound having two or more conjugated double bonds. As examples of constituent (3) are included cyclic hydrocarbons having two or more, preferably 2 to 4, more preferably 2 to 3, conjugated double bonds, and having a total number of carbon atoms of 4 to 24, preferably 4 to 12, preferably cyclic hydrocarbons having one or more rings and a total number of carbon atoms of 4 to 24, preferably 4 to 12, the said rings each having two or more, preferably 2 to 4, more preferably 2 to 3, conjugated double bonds; cyclic hydrocarbons resulting from partial substitution of the above cyclic hydrocarbons with one to six hydrocarbon groups (typically an alkyl or aralkyl group of 1 to 12 carbon atoms); organosilicon compounds containing a cyclic hydrocarbon group having two or more, preferably 2 to 4, more preferably 2 to 3, conjugated double bonds, and a total number of carbon atoms of 4 to 24, preferably 4 to 12, preferably a cyclic hydrocarbon group having one or more rings and a total number of carbon atoms of 4 to 24, preferably 4 to 12, the said rings each having two or more, preferably 2 to 4, more preferably 2 to 3, conjugated double bonds; organosilicon compounds resulting from partial substitution of the above cyclic hydrocarbon groups with one to six hydrocarbon residues; and alkali metal salts (e.g. sodium salts and lithium salts) of these compounds. Particularly preferred are those containing a cyclopentadiene structure in their molecules.

Compounds represented by the following general formula are mentioned as suitable examples of the above cyclic hydrocarbons:

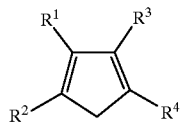

(1)

where $R^1$, $R^2$, $R^3$ and $R^4$ are each independently a hydrogen or a hydrocarbon residue (preferably of 1 to 10 carbon atoms), provided any two of $R^1$, $R^2$, $R^3$ and $R^4$ may conjointly form a cyclic hydrocarbon group.

As examples of the hydrocarbon residue are mentioned such alkyl groups as methyl, ethyl, propyl, isopropyl, butyl, t-butyl, hexyl and octyl, such an aryl group as phenyl, such alkoxy groups as methoxy, ethoxy and propoxy, such an aryloxy group as phenoxy, such an aralkyl group as benzyl, and are further mentioned cyclopentatriene, aryl, and condensed rings thereof, as examples of the skeleton of a cyclic hydrocarbon group in the case of any two conjointly forming the said cyclic hydrocarbon group. More concrete and suitable examples of compounds represented by the above formula are cyclopentadiene, indene, azulene, as well as alkyl-, aryl-, aralkyl-, alkoxy- or aryloxy- substituted derivatives thereof. Compounds with the compounds of the above general formula bonded (crosslinked) through an alkylene group (having usually 2 to 8, preferably 2 to 3, carbon atoms) are also suitable.

The organosilicon compounds having a cyclic hydrocarbon group can be represented by the following general formula:

$$A_L SiR_{4-L}$$

where A represents the foregoing cyclic hydrocarbon group exemplified by cyclopentadienyl, substituted cyclopentadienyl, indenyl and substituted indenyl, R is hydrocarbon residue having 1 to 24, preferably 1 to 12, carbon atoms, examples of which are such alkyl groups as methyl, ethyl, propyl, isopropyl, butyl, t-butyl, hexyl and octyl, such alkoxy groups as methoxy, ethoxy, propoxy and butoxy, such an aryl group as phenyl, such an aryloxy group as phenoxy, and such an aralkyl group as benzyl, or hydrogen, and L is $1 \leq L \leq 4$, preferably $1 \leq L \leq 3$.

Concrete examples of organocyclic hydrocarbons employable as constituent (3) include cyclopolyenes or substituted cyclopolyenes having 7 to 24 carbon atoms such as cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, cycloheptatriene, methylcycloheptatriene, cyclooctatetraene, methylcyclooctatetraene, azulene, methylazulene, ethylazulene, fluorene, and methylfluorene, as well as monocyclopentadienylsilane, biscyclopentadienylsilane, triscyclopentadienylsilane, tetrakiscyclopentadienylsilane, monocyclopentadienylmonomethylsilane, monocyclopentadienylmonoethylsilane, monocyclopentadienyldimethylsilane, monocyclopentadienyldiethylsilane, monocyclopentadienyltrimethylsilane, monocyclopentadienyltriethylsilane, monocyclopentadienylmonomethoxysilane, monocyclopentadienylmonoethoxysilane, monocyclopentadienylmonophenoxysilane, biscyclopentadienylmonomethylsilane, biscyclopentadienylmonoethylsilane, biscyclopentadienyldimethylsilane, biscyclopentadienyldiethylsilane, biscyclopentadienylmethylethylsilane, biscyclopentadienyldipropylsilane, biscyclopentadienylethylpropylsilane, biscyclopentadienyldiphenylsilane, biscyclopentadienylphenylmethylsilane, biscyclopentadienylmonomethoxysilane, biscyclopentadienylmonoethoxysilane, triscyclopentadienylmonomethylsilane, triscyclopentadienylmonoethylsilane, triscyclopentadienylmonomethoxysilane, triscyclopentadienylmonoethoxysilane, 3-methylcyclopentadienyl silane, bis-3-methylcyclopentadienylsilane, 3-methylcyclopentadienylmethylsilane, 1,2-dimethylcyclopentadienylsilane, 1,3-dimethylcyclopentadienylsilane, 1,2,4-trimethylcyclopentadienylsilane, 1,2,3,4-tetramethylcyclopentadienylsilane, pentamethylcyclopentadienylsilane, monoindenylsilane, bisindenylsilane, trisindenylsilane, tetrakisindenylsilane, monoindenylmonomethylsilane, monoindenylmonoethylsilane, monoindenyldimethylsilane, monoindenyldiethylsilane, monoindenyltrimethylsilane, monoindenyltriethylsilane, monoindenylmonomethoxysilane, monoindenylmonoethoxysilane, monoindenylmonophenoxysilane, bisindenylmonomethylsilane, bisindenylmonoethylsilane, bisindenyldimethylsilane, bisindenyldiethylsilane, bisindenylmethylethylsilane, bisindenyldipropylsilane, bisindenylethylpropylsilane, bisindenyldiphenylsilane, bisindenylphenylmethylsilane, bisindenylmonomethoxysilane, bisindenylmonoethoxysilane, trisindenylmonomethylsilane, trisindenylmonoethylsilane, trisindenylmonomethoxysilane, trisindenylmonoethoxysilane, 3-methylindenylsilane, bis-3-methylindenylsilane, 3-methylindenylmethylsilane, 1,2-dimethylindenylsilane, 1,3-dimethylindenylsilane, 1,2,4-trimethylindenylsilane, 1,2,3,4-tetramethylindenylsilane and pentamethylindenylsilane.

Compounds with any of the above compounds bonded through an alkylene group (usually having 2 to 8, preferably 2 to 3, carbon atoms) are also employable as constituent (3) in the present invention. Examples of such compounds include bisindenylethane, bis(4,5,6,7-tetrahydro-1-indenyl) ethane, 1,3-propanedenylbisindene, 1,3-propandenylbis(4,5, 6,7-tetrahydro)indene, propylenebis(1-indene), isopropyl(1-indenyl)cyclopentadiene, diphenylmethylene(9-fluorenyl) cyclopentadiene, isopropylcyclopentadienyl-1-fluoreneisopropylbiscyclopentadiene. Of course, two or more of these compounds may be combined for use.

The following description is provided about constituent (4), namely, a modified organoaluminum compound containing Al—O—Al bond. Usually, the modified organoaluminum compound contains 1 to 100, preferably 1 to 50, Al—O—Al bonds in the molecule. The modified organoaluminum compound may be either linear or cyclic.

Such a modified organoaluminum compound is usually prepared by reacting an organoaluminum compound and water. The reaction of an organoaluminum compound and water is performed usually in an inert hdyrocarbon. As the inert hdyrocarbon there may be used any of aliphatic, alicyclic and aromatic hydrocarbons such as pentane, hexane, heptane, cyclohexane, methylcyclohexane, benzene, toluene and xylene, with aliphatic and aromatic hydrocarbons being preferred.

As the organoaluminum compound for use in the preparation of the modified organoaluminum compound there may be preferably used any of compounds represented by the general formula $R_nAlX_{3-n}$ where R is a linear or branched hydrocarbon group such as an alkyl, alkenyl, aryl or aralkyl group having 1 to 18, preferable 1 to 12, carbon atoms, X is a hydrogen atom or a hydrogen atom, and n is an integer in the range of $1 \leq n \leq 3$.

Particularly, trialkylaluminum compounds are preferred, in which the alkyl group may be any of methyl, ethyl, propyl, isopropyl, butyl, isobutyl, pentyl, hexyl, octyl, decyl and dodecyl, with methyl being particularly preferred.

The reaction ratio of water and the organoaluminum compound ($H_2O$/Al mole ratio) is in the range from 0.25/1 to 1.2/1, preferably 0.5/1 to 1/1. The reaction temperature is usually in the range of −70° to 100° C., preferably −20° to 20° C., and a suitable reaction time is selected usually in the range of 5 minutes to 24 hours, preferably 10 minutes to 5 hours. As water for use in the reaction there may be used not only the ordinary water but also water of crystallization contained, for example, in copper sulfate hydrate or aluminum sulfate hydrate.

As typical examples of the modified organoaluminum compounds are mentioned compounds usually called aluminoxanes which may be obtained by reacting an alkyl aluminum and water. It goes without saying that two or more modified organoaluminum compounds may also be used in combination.

The following description is provided about constituent (5), namely, the inorganic carrier and/or particulate polymer carrier.

In the stage of preparing the catalyst used in the present invention, the inorganic carrier may be in any shape; for example, it may be powdered, granular, flaky, foil-like, or fibrous, as long as it retains its original shape. No matter in which shape the inorganic carrier may be, its maximum length is usually in the range of 5 to 200 $\mu$m, preferably 10 to 100 $\mu$m. It is desirable that the inorganic carrier be porous, and usually its surface area is in the range of 50 to 1,000 m$^2$ and pore volume in the range of 0.05 to 3 cm$^3$.

As inorganic carriers employable in the present invention there are mentioned carbonaceous substances, metals, metal oxides, metal chlorides, metal carbonates, and mixtures thereof. These are usually calcined in air or in an inert gas such as nitrogen or argon at 200° to 900° C. before use.

As suitable examples of metals employable as inorganic carriers there are mentioned iron, aluminum and nickel. As example of metal oxides are mentioned sole oxides and double oxides of Group I–VIII metals in the Periodic Table. More concrete examples are $SiO_2$, $Al_2O_3$, $MgO$, $CaO$, $B_2O_3$, $TiO_2$, $ZrO_2$, $Fe_2O_3$, $SiO_2 \cdot Al_2O_3$, $Al_2O_3 \cdot MgO$, $Al_2O_3 \cdot CaO$, $Al_2O_3 \cdot MgO \cdot CaO$, $Al_2O_3 \cdot MgO \cdot siO_2$, $Al_2O_3 \cdot CuO$, $Al_2O_3 \cdot Fe_2O_3$, $Al_2O_3 \cdot NiO$ and $SiO_2 \cdot MgO$. These formulas expressed in terms of oxides are not molecular formulas but represent only compositions. In other words, the structure and component ratio of double oxides which may be used in the present invention are not specially limited. The metal oxides may contain a small amount of water adsorbed therein and a small amount of impurities.

Preferred examples of metal chlorides employable in the present invention are chlorides of alkali metals and alkaline earth metals, with $MgCl_2$ and $CaCl_2$ being particularly suitable. Likewise, preferred examples of metal carbonates employable in the invention are carbonates of alkali metals and alkaline earth metals such as magnesium carbonate, calcium carbonate and barium carbonate. As examples of carbonaceous substances employable in the invention there are mentioned carbon black and active carbon.

All of the inorganic carriers referred to above are employable suitably in the present invention, but silica and alumina as metal oxides are particularly preferred.

On the other hand, as examples of particulate polymer carriers employable in the present invention both thermoplastic resins and thermosetting resins are employable if only they retain their solid state without melting during catalyst preparation and polymerization reaction. These polymers carriers usually range in particle diameter from 5 to 2,000 μm, preferably 10 to 100 μm, and as to their molecular weights, no limitation is placed thereon if only the polymers can exist as solid substances during catalyst preparation and polymerization reaction. Those ranging from low to ultra-high molecular weight are employable.

Examples are various particulate polyolefins (preferably 2 to 12 carbon atoms) typified by particulate ethylene polymers, ethylene/α-olefin copolymers, propylene polymers or copolymers, and poly-1-butene, as well as particulate polyesters, polyamides, polyvinyl chloride, polymethyl methacrylates, polymethyl acrylates, polystyrenes, polynorbornenes, various natural polymers, and mixtures thereof.

Any of the inorganic carriers and particulate polymer carriers exemplified above may be used as it is as constituent (5) in the present invention, but before use as constituent (5) it may be contacted with an organoaluminum compound such as trimethylaluminum, triethylaluminum, triisobutylaluminum, tri-n-hexylaluminum, dimethylaluminum chloride, diethylaluminum chloride, or diethylmonoethoxyaluminum, or a modified organoaluminum compound containing Al—O—Al bond, which compound will be described later, or a silane compound.

Further, as to the inorganic carrier, it may be contacted, before use as constituent (5), with, for example, an active hydrogen-containing compound such as aldehyde, an electron donating compound such as ester or ether, or an alkoxide group-containing compound such as tetraalkoxysilicate, trialkoxyaluminum, or transition metal tetraalkoxide. This method is also preferred.

As an example of a method for performing such contact treatment there is mentioned a method wherein the carrier is contacted with a pretreatment such as any of those exemplified above, with or without stirring, in an inert stmosphere of nitrogen or argon and in the presence of a liquid, inert hydrocarbon such as an aromatic hydrocarbon (usually 6 to 12 carbon atoms), e.g. benzene, toluene, xylene or ethylbenzene, or an aliphatic or alicyclic hydrocarbon (usually 5 to 12 carbon atoms), e.g. heptane, hexane, decane, dodecane or cyclohexane. It is desirable that this contact treatment be conducted at a temperature of usually −100° C. to 200° C., preferably −50° to 100° C., for minutes to 50 hours, preferably 1 to 24 hours.

This contact reaction is preferably carried out in a solvent capable of dissolving the foregoing pretreatment compound, such as an aromatic hydrocarbon (usually 6 to 12 carbon atoms), e.g. benzene, toluene, xylene or ethylbenzene. In this case, after the contact reaction, the solvent may be used as it is, without removal, in the preparation of the catalyst component to be used in the invention. There may be adopted a method wherein a liquid, inert hydrocarbon in which the pretreatment compound is insoluble or difficult to dissolve (for example, such an aliphatic or alicyclic hydrocarbon as pentane, hexane, decane, dodecane or cyclohexane in the case where the pretreatment compound is a modified organoaluminum compound) is added to the contact reaction product, allowing constituent (5) to be deposited as a solid product, followed by drying. There also may be adopted a method wherein part or the whole of the aromatic hydrocarbon used as solvent in the pretreatment is removed by drying or any other suitable means and thereafter constituent (5) is withdrawn as a solid product.

The ratio of the pretreatment compound to the inorganic carrier and/or particulate polymer carrier subjected to the pretreatment is not specially limited if only it does not affect the object of the present invention. But a suitable such ratio is selected usually in the range of 1 to 10,000 mmols, preferably 5 to 1,500 mmols, (as Al atom cocentration in the case of a modified aluminum compound), based on 100 g of the carrier(s).

As mentioned above, the catalyst component used in the present invention is prepared by contacting the constituents (1) to (4) beforehand with one another, but as to in what order these constituents are to be contacted, there is no special limitation. For example, the constituents (1) to (4) may be contacted by any of the following methods:

(A) A method wherein the constituents (1) to (4) are contacted simultaneously.

(B) A method wherein the constituents (1) to (3) are contacted simultaneously, followed by contact with constituent (4).

(C) A method wherein the constituents (2) to (4) are contacted simultaneously, followed by contact with constituent (4).

(D) A method wherein the constituents (1), (3) and (4) are contacted simultaneously, followed by contact with constituent (2).

(E) A method wherein the constituents (1), (2) and (4) are contacted simultaneously, followed by contact with constituent (3).

(F) A method wherein the constituents (1) and (2) are first contacted together, followed by contact with constituent (3) and subsequent contact with constituent (4).

(G) A method wherein the constituents (1) and (2) are first contacted together, followed by contact with constituent (4) and subsequent contact with constituent (3).

(H) A method wherein the constituents (1) and (3) are first contacted together, followed by contact with constituent (2) and subsequent contact with constituent (4).

(I) A method wherein the constituents (1) and (3) are first contacted together, followed by contact with constituent (4) and subsequent contact with constituent (2).

(J) A method wherein the constituents (1) and (4) are first contacted together, followed by contact with constituent (2) and subsequent contact with constituent (3).

(K) A method wherein the constituents (1) and (4) are first contacted together, followed by contact with constituent (3) and subsequent contact with constituent (2).

(L) A method wherein the constituents (2) and (3) are first contacted together, followed by contact with constituent (1) and subsequent contact with constituent (4).

(M) A method wherein the constituents (2) and (3) are first contacted together, followed by contact with constituent (4) and subsequent contact with constituent (1).

(N) A method wherein the constituents (2) and (4) are first contacted together, followed by contact with constituent (1) and subsequent contact with constituent (3).

(O) A method wherein the constituents (2) and (4) are first contacted together, followed by contact with constituent (3) and subsequent contact with constituent (1).

(P) A method wherein the constituents (3) and (4) are first contacted together, followed by contact with constituent (1) and subsequent contact with constituent (2).

(Q) A method wherein the constituents (3) and (4) are first contacted together, followed by contact with constituent (2) and subsequent contact with constituent (1).

(R) A method wherein the constituents (1) and (4) are first contacted together, followed by contact with constituent (2) and subsequent contact with constituent (3).

(S) A method wherein the constituents (1) and (4) are first contacted together, followed by contact with constituent (3) and subsequent contact with constituent (2).

Above all, the methods (A), (B), (C) and (D) are preferred.

Also regarding how to contact these four constituents, there is no special limitation, but usually there is adopted a method wherein the constituents are contacted, with or without stirring, in an inert atmosphere such as a nitrogen or argon atmosphere and in the presence of an aromatic hydrocarbon (usually 6 to 12 carbon atoms) such as benzene, toluene, xylene or ethylbenzene or an aliphatic or alicyclic hydrocarbon (usually 5 to 12 carbon atoms) such as heptane, hexane, decane, dodecane or cyclohexane. This contact treatment is performed at a temperature usually in the range of −100° C. to 200° C., preferably −50° to 100° C., for 30 minutes to 50 hours, preferably 1 to 24 hours.

In contacting the constituents (1) and (4), as mentioned previously, both an aromatic hydrocarbon solvent capable of dissolving certain constituent(s) and an aliphatic or alicyclic hydrocarbon solvent incapable of dissolving or difficult to dissolve certain constituent(s) are employable. Particularly, it is desirable to use an aromatic hydrocarbon solvent capable of dissolving the constituents (1) to (4). In the case where the contact reaction of the constituent is performed stepwise, a soluble aromatic hydrocarbon solvent used in a previous stage may be used as it is, without removal, as a solvent in the subsequent stage of contact reaction. After the previous stage of contact reaction using a soluble solvent and after subsequent addition of a liquid inert hydrocarbon (for example, an aliphatic or alicyclic hydrocarbon such as pentane, hexane, decane, dodecane or cyclohexane) in which a certain constituent is soluble or difficult to dissolve to recover a desired product as solids, or after subsequent removal of part or the whole of the aromatic hydrocarbon solvent used by drying or any other suitable means to withdraw the desired product as solids, the succeeding stage of the desired product may be carried out using any of the inert hydrocarbon solvents referred to above. In the present invention, each contact reaction of constituent may be performed a plural number of times.

Reference will now be made to the proportions of constituents (1) to (4). First, as to the constituents (1) and (2), the proportion of constituent (2) is usually in the range of 0.01 to 100 mols, preferably 0.1 to 50 mols, more preferably 1 to 20 mols, per mol of constituent (1). As to the constituents (1) and (3), the proportion of constituent (3) is usually in the range of 0.01 to 100 mols, preferably 0.1 to 50 mols, more preferably 1 to 20 mols, per mol of constituent (1). Further, as to the constituents (1) and (4), the proportion of constituent (4) is usually in the range of 1 to 10,000 mols, preferably 10 to 1,000 mols, per mol of constituent (1).

The amount of the transition metal to be supported on the carrier(s) is not specially limited, but per gram of constituent (5), the amount of the transition metal in constituent (1) is usually in the range of 0.01 to 10 wt % (0.1 mg to 0.1 g), preferably 0.05 to 8 wt % (0.5 mg to 0.08 g), more preferably 0.1 to 5 wt % (1.0 mg to 0.05 g).

After satisfying the above requirements for composition ratio, it is desirable to further satisfy that the constituent (2)/constituent (3) mol ratio should be in the range of usually 1/1 to 20/1, preferably 2/1 to 10/1, and that as to the constituents (4) and (5), the proportion of constituent (4) per gram of constituent (5) should be in the range of usually 2 to 60 wt % (0.02 g to 0.6 g), preferably 10 to 50 wt % (0.1 g to 0.6 g), more preferably 30 to 50 wt % (0.3 g to 0.5 g).

As to in what manner the product resulting from the contact treatment of constituents (1) to (4) is to be contact with constituent (5), no special limitation is placed thereon, but as an example there is mentioned a method wherein the said product is contacted with constituent (5) with stirring or without stirring in an inert atmosphere such as a nitrogen or argon atmosphere and in the presence of a liquid, inert hydrocarbon such as an aromatic hydrocarbon (usually 6 to 12 carbon atoms) e.g. benzene, toluene, xylene or ethylbenzene, or an aliphatic or alicyclic hydrocarbon (usually 5 to 12 carbon atoms) e.g. heptane, hexane, decane, dodecane or cyclohexane. Conditions for this contact treatment are not specially limited, but it is desirable that the contact treatment be conducted at a temperature usually in the range of −100° C. to 200° C., preferably −50° to 100° C., for 10 minutes to 50 hours, preferably 30 minutes to 24 hours, more preferably 1 to 12 hours. It is more desirable that this contact reaction be carried out in a solvent in which the constituents (1) to (4) are soluble, usually an aromatic hydrocarbon (usually 6 to 12 carbon atoms) such as toluene, xylene or ethylbenzene. In this case, after the contact reaction, the solvent may be used as it is in the polymerization reaction without removal.

Further, after the contact reaction and subsequent removal of part or the whole of the solvent by drying or any other suitable means, leaving the product substantially as a solid catalyst, this solid catalyst may be used in the polymerization reaction.

In connection with the catalyst used in the present invention, the following combination is mentioned as a suitable example of combination of constituents (1) to (5): as constituent (1), a tetraalkylzirconium compound such as tetramethylzirconium or a tetraaralkylzirconium compound such as tetrabenzylzirconium; as constituent (2), a trialkylaluminum compound such as triethylaluminum, triisobutylaluminum, or trihexylaluminum, or tridecylaluminum, or a halogen-containing alkylaluminum compound such as diethylaluminum chloride or ethylaluminum dichloride; as constituent (3), indene, an indene derivative such as methylindene or trimethylsilylindene, cyclopentadiene, a cyclopentadiene derivative such as methylcyclopentadiene, dimethylcyclopentadiene, trimethylcyclopentadiene, or trimethylsilylcyclopentadiene, a compound with an indene derivative or cyclopentadiene derivative such as bisindenylethane or isopropylbiscyclopentadiene bonded through an alkylene group, or a compound of the foregoing general formula $A_L SiR_{4-L}$ such as dimethylsilylbiscyclopentadiene; as constituent (4), methylaluminoxane; and as constituent (5), silica, alumina, silica-alumina, or silica-titania.

The following is mentioned as another suitable example of combination: as constituent (1), a tetraalkyltitanium compound such as tetramethyltitanium a tetraalkoxytitanium compound such as tetra-n-butoxytitanium or a tetraisopropoxytitanium, or a tetraaralkyltitanium compound such as tetrabenzyltitanium; as constituent (2), a trialkylaluminum compound such as trimethylaluminum, triethylaluminum, triisobutylaluminum, trihexylaluminum, or tridecylaluminum, a halogen-containing alkylaluminum compound such as diethylaluminum chloride or ethylaluminum dichloride, or an aluminum hydride such as diisobutylaluminum hydride; as constituent (3), indene, an indene derivative such as methylindene or trimethylsilylindene, cyclopentadiene, a cyclopentadiene derivative such as methylcyclopentadiene, dimethylcyclopentadiene, trimethylcyclopentadiene, or trimethylsilylcyclopentadiene, a compound with an indene derivative or cyclopentadiene derivative such as bisindenylethane or isopropylbiscyclopentadiene bonded through an alkylene group, or a compound of the general formula $A_L SiR_{4-L}$ such as dimethylsilylbiscyclopentadiene; as constituent (4), methylaluminoxane; and as constituent (5), silica, alumina, silica-alumina, or silica-titania.

The following is mentioned as a futher suitable example of combination: as constituent (1), a tetraalkoxyzirconium compound such as tetra-n-butoxyzirconium or tetraisopropoxyzirconium; as constituent (2), a trialkylaluminum compound such as triethylaluminum, triisobutylaluminum, trihexylaluminum, or tridecylaluminum, or an alkylaluminum alkoxide such as diethylaluminum butoxide, ethyldibutoxyaluminum, diethylethoxyaluminum, or an aluminum hydride such as diisobutylaluminum hydride; as constituent (3), indene, an indene derivative such as methylindene or trimethylsilylindene, cyclopentadiene, a cyclopentadiene derivative such as methylcyclopentadiene, dimethylcyclopentadiene, trimethylcyclopentadiene, a compound with an indene derivative or cyclopentadiene derivative such as bisindenylethane or isopropylbiscyclopentadiene bonded through an alkylene group, or a compound of the general formula $A_L SiR_{4-L}$ such as dimethylsilylbiscyclopentadiene; as constituent (4), methylaluminoxane; and as constituent (5), silica, alumina, silica-alumina, or silica-titania.

As a still futher suitable example of combination, the following is mentioned: as constituent (1), a zirconium chloride compound such as zirconium tetrachloride, phenoxyzirconium trichloride, isopropoxyzirconium trichloride, or benzylzirconium trichloride; as constituent (2), an alkyllithium compound such as butyllithium or methyllithium, or an alkylmagnesium compound such as ethylmagnesium bromide or butylmagnesium chloride; as constituent (3), indene, an indene derivative such as methylindene or trimethylsilylindene, cyclopentadiene, a cyclopentadiene derivative such as methylcyclopentadiene, dimethylcyclopentadiene, trimethylcyclopentadiene or trimethylsilylcyclopentadiene, a compound with an indene derivative or cyclopentadiene derivative such as bisindenylethane or isopropylbiscyclopentadiene bonded through an alkylene group, or a compound of the general formula $A_L SiR_{4-L}$ such as dimethylsilylbiscyclopentadiene; as constituent (4), methylaluminoxane; and as constituent (5), silica, alumina, silica-alumina, or silica-titania.

As a still futher suitable example of combination, the following is mentioned: as constituent (1), a tetraalkoxyzirconium compound such as tetra-nbutoxyzirconium or tetraisopropoxyzirconium; as constituent (2), a trialkylaluminum compound such as trimethylaluminum, triethylaluminum, triisobutylaluminum, trihexylaluminum, or tridecylaluminum, or a halogen-containing alkylaluminum compound such as diethylaluminum chloride or ethylaluminum dichloride; as constituent (3), indene, an indene derivative such as methylindene or trimethylsilylindene, cyclopentadiene, a cyclopentadiene derivative such as methylcyclopentadiene, dimethylcyclopentadiene, trimethylcyclopentadiene, or trimethylsilylcyclopentadiene, a compound with an indene derivative or cyclopentadiene derivative such as bisindenylethane or isopropylbiscyclopentadiene bonded through an alkylene group, or a compound of the general formula $A_L SiR_{4-L}$ such as dimethylsilylbiscyclopentadiene; as constituent (4), methylaluminoxane; and as constituent (5), silica, alumina, silica-alumina, or silica-titania.

The following is mentioned as another suitable example of combination: as constituent (1), a tetraalkylzirconium compound such as tetramethylzirconium or a tetraaralkylzirconium compound such as tetrabenzylzirconium; as constituent (2), a trialkylaluminum compound such as triethylaluminum, triisobutylaluminum, trihexylaluminum, or tridecylaluminum, or a halogen-containing alkylaluminum compound such as diethylaluminum chloride or ethylaluminum dichloride; as constituent (3), indene, an indene derivative such as methylindene or trimethylsilylindene, cyclopentadiene, a cyclopentadiene derivative such as methylcyclopentadiene, dimethylcyclopentadiene, trimethylcyclopentadiene, or trimethylsilylcyclopentadiene, a compound with an indene derivative or cyclopentadiene derivative such as bisindenylethane or isopropylbiscyclopentadiene bonded through an alkylene group, or a compound of the general formula $A_L SiR_{4-L}$ such as dimethylsilylbiscyclopentadiene; as constituent (4), methylaluminoxane; and as constituent (5), silica, alumina, silica-alumina, or silica-titania.

The manufacturing process of the present invention, is applicable to the preparation of homopolymers or copolymers of various olefins.

In the olefins referred to herein there are included α-olefins, cyclic olefins, dienes, trienes and styrene analogs. Examples of α-olefins include those having 2 to 12, preferable 2 to 8, carbon atoms. More concrete examples are ethylene, propylene butene-1, hexene-1 and 4-methylpentene-1. An α-olefin can be homopolymerized in the presence of the catalyst used in the invention and it is also possible to copolymerize two or more kinds of α-olefins using such catalyst. The copolymerization may be any of alternating copolymerization, random copolymerization and block copolymerization.

In the copolymerization of α-olefins there are included the case where ethylene and an α-olefins having 3 to 12, preferably 3 to 8, carbon atoms are copolymerized, such as ethylene/propylene, ethylene/butene-1, ethylene/hexene-1 and ethylene/4-methylpentene-1 and the case where propylene and an α-olefins having 3 to 12, preferably 3 to 8, carbon atoms are copolymerized, such as propylene/butene-1, propylene/4-methylpentene-1, propylene/4-methylbutene-1, propylene/hexene-1 and propylene/octene-1. In the case of copolymerizing ethylene or propylene with another α-olefin, the amount of such α-olefin may be selected optionally on condition that it does not exceed 90 mol % of the total monomer quantity. Generally, however, in the case of an ethylene copolymer, the amount of such another α-olefin is not larger than 40 mol %, preferably not larger than 30 mol %, more preferably not larger than 20 mol %, while in the case of a propylene copolymer, the amount of such another α-olefin is selected in the range of 1–90 mol %, preferably 5–90 mol %, more preferably 10–70 mol %.

Examples of cyclic olefins employable in the invention are those having 3 to 24, preferable 3 to 18, carbon atoms, including cyclopentene, cyclobutene, cyclohexane, 3-methylcyclohexene, cyclooctene, cyclodecene, cyclododecene, tetracyclododecene, octacyclododecene, norbornene, 5-methyl-2-norbornene, 5-ethyl-2-norbornene, 5-isobutyl-2-norbornene, 5,6-dimethyl-2-norbornene, and 5,5,6-trimethyl-2-norbornene. Usually, a cyclic olefin is copolymerized with the foregoing α-olefin and in this case the amount of the cyclic olefin is not larger than 50 mol %, usually in the range of 1–50 mol %, preferably 2–50 mol %, relative to the copolymer.

Dienes and trienes employable in the present invention are polyenes having 4 to 26, preferable 6 to 26, carbon atoms. Examples are butadiene, 1,3-pentadiene, 1,4-pentadiene, 1,3-hexadiene, 1,4-hexadiene, 1,5-hexadiene, 1,3-cyclohexadiene, 1,4-cyclohexadiene, 1,9-decadiene, 1,13-tetradecadiene, 2,6-dimethyl-1,5-heptadiene, 2-methyl-2,7-octadiene, 2,7-dimethyl-2,6-octadiene, 2,3-dimethylbutadiene, ethylidene norbornene, dicyclopentadiene, isoprene, 1,3,7-octatriene, and 1,5,9-decatriene. In the case of using a chain diene or triene in the present invention, it is usually copolymerized with the foregoing α-olefin and the content of chain diene and/or triene in the copolymer is usually in the range of 0.1 to 50 mol %, preferably 0.2 to 10 mol %.

Styrene analogs employable in the present invention are styrene and styrene derivatives. As examples of such derivatives there are mentioned t-butylstyrene, α-methylstyrene, p-methylstyrene, divinylbenzene, 1,1-diphenylethylene, N,N-dimethyl-p-aminoethylstyrene, and N,N-diethyl-p-aminoethylstyrene.

The process of the present invention is also applicable suitably to the case where a homopolymer or copolymer of an olefin is further polymerized with a polar monomer for the purpose of modification thereof. As examples of the polar monomer are mentioned such unsaturated carboxylic acid esters as methyl acrylate, methyl methacrylate, butyl methacrylate, dimethyl maleate, monomethyl maleate, diethyl fumarate and dimethyl itaconate. The polar monomer content of the modified copolymer is usually in the range of 0.1 to 10 mol %, preferably 0.2 to 2 mol %.

The polymerization reaction may be carried out in the form of slurry polymerization, solution polymerization, or a substantially solvent-free vapor phase polymerization, in the presence of the catalyst specified above. Particularly, a slurry polymerization or a vapor phase polymerization is preferred. Olefin(s) is polymerized in a substantially oxygen- and water-free condition and in the presence or absence of an inert hydrocarbon solvent selected from aliphatic hydrocarbons such as hexane and heptane, aromatic hydrocarbons such as benzene, toluene and xylene and alicyclic hydrocarbons such as cyclohexane and methylcyclohexane. Conditions for the polymerization, involve a temperature in the range of 20° C. to 200° C., preferably 50° to 100° C., a pressure in the range from atmospheric pressure to 70 kg/cm$^2$/G, preferably from atmospheric pressure to 20 kg/cm$^2$G, and a polymerization time in the range from 5 minutes to 10 hours, preferably 5 minutes to 5 hours.

In the polymerization, a modified organoaluminum compound (e.g. methylaluminoxane) having Al—O—Al bond may be used as a further catalyst constituent in addition to the catalyst specified above.

A component for the removal of water, the socalled scavenger, may be added into the polymerization system. As examples of such scavenger there are mentioned compounds represented by the general formura $Me^2R^3{}_m(OR^4)_nX_{z-m-n}$. Suitable examples are organoaluminum compound typical of which are such trialkylaluminum compounds as trimethylaluminum, triethylaluminum, tripropylaluminum, triisopropylaluminum, and triisobutylaluminum, as well as organolithium compounds, e.g. butyllithium, organomagnesium compounds such as diethylmagnesium, dibutylmagnesium and butylmagnesium chloride, various modified organoaluminum compound, and modified organoaluminum compounds having branched alkyl groups.

The molecular weight of the polymer to be prepared can be adjusted to some extent by changing polymerization conditions such as polymerization temperature and catalyst mol ratio, but the addition of hydrogen to the polymerization reaction system is more effective for this purpose. In the process of the present invention, the type of polymerization is not specially limited, and the process of the invention is also applicable to a multi-stage polymerization of two or more stages involving different hydrogen concentrations and different polymerization temperatures.

EXAMPLES

The present invention will be described below concretely by way of working examples and comparative example, but it is to be understood that the invention is not limited thereto.

The following methods were adopted to determine physical properties of the polymers obtained in the following working examples and comparative example.
Melt Index (MI)
Determined according to ASTM D 1238-57T (190° C., load: 2.16 kg).
Density
Determined according to ASTM D 1505-68.
Determination of Melting Point using Differential Scanning Calorimeter (DSC)

Using a melting point measuring device Model DSC-20 (a product of Seiko Denshi K.K.), a sample (5 mg) is held at 180° C. for 3 minutes, then cooled to 0° C. at a rate of 10° C./min, and after holding the sample at 0° C. for 10 minutes, the temperature is raised at a rate of 10° C./min to determine the melting point.

A modified organoaluminum compound (methylaluminoxane) used in the following working examples and comparative example was prepared in the following manner.

13 g of copper sulfate pentahydrate was placed in a three-necked flask having an internal volume of 300 ml and equipped with an electromagnetic induction stirrer and was suspended in 50 ml of toluene. Then, 150 ml of solution containing 1 mmol/ml of trimethylaluminum was added dropwise into the resulting suspension at 0° C. over a 2 hour period.

Thereafter, the temperature was raised to 25° C. and reaction was allowed to take place at that temperature for 24 hours. Subsequently, the reaction solution was filtered to remove toluene from the solution containing the reaction product, thereby affording 4 g of methylaluminoxane as white crystals.
Measuring Haze Value Measured according to JIS K7105. A pressed sheet specimen of 0.5±0.01 mm was prepared (after holding at a heating temperature of 180° C. for 5 minutes, molding was performed at the same temperature and at a pressure of 50 kgf, over a 5 minute period, followed by cooling to room temperature at a rate of 20° C./min), and then measured for haze value using a light transmittance measuring device with integrating sphere (HGM-2DP, a product of Suga Shikenki).
Heat-Sealing Temperature A film having a width of 300 mm and a thickness of 30 μm was prepared using an inflation molding machine for linear low-density polyethylenes. Molding conditions were as follows: resin temperature 200° C., amount of resin extruded 20 kg/h, die diameter 100 mm, pip cap 2 mm.

The temperature affording a peeling test strength of 300 gf at a sealing pressure of 2 kg/cm$^2$ and a sealing time of one second, using a heat sealer (a product of Tester Sangyo), was adopted as a heat-sealing temperature.

The peeling test was conducted at a specimen width of 15 mm and a pulling rate of 300 mm/min.

Example 1

(1) Preparation of Catalyst 150 ml of purified toluene was fed in a nitrogen atmosphere into a three-necked 300 ml flask equipped with an electromagnetic induction stirrer, then 3.3 g of tetrapropoxyzirconium ($Zr(On-Pr)_4$) and 9.3 g of indene were added. After stirring at room temperature for 30 minutes, the reaction system was held at 0° C. and 11.1 g of triethylaluminum ($AlEt_3$) was added dropwise over a period of 30 minutes. Thereafter, the temperature of the reaction system was raised to room temperature, at which temperature there was conducted stirring for 5 hours. The resulting solution is here designated solution A. The Zr concentration of the solution A was 0.057 mmol/ml as Zr.

Next, 10 ml of purified toluene was charged in a nitrogen atmosphere into another three-necked 100 ml flask equipped with a stirrer, then 4.8 ml of the solution A and subsequently 27.4 ml of a methylaluminoxane solution in toluene (concentration: 1 mmol/ml) were added and reacted. The resulting solution is here designated solution B.

Next, 20 ml of purified toluene was fed in a nitrogen atmosphere into a three-necked 100 ml flask equipped with a stirrer, then 5 g of silica (Grade #952, surface area 300 $m^2/g$, a product of Fuji-Davison Co.) which had been calcined at 600° C. for 5 hours was added and thereafter the whole quantity of the solution B was added, followed by stirring at room temperature for 2 hours. Subsequently, the solvent was removed by blowing of nitrogen, leaving a powder superior in fluidity.

(2) Polymerization

A stainless steel autoclave having an internal volume of 3 liters and equipped with a stirrer was purged with nitrogen, into which was then added the solid catalyst prepared above in an amount corresponding to 0.5 mg of Zr. Thereafter, the temperature was raised to 80° C. and then a gaseous mixture of ethylene and butene-1 [butene-1/ethylene=0.25 (molar ratio)] was introduced to a total pressure of 9 $kgf/cm^2G$ to start polymerization. The polymerization was continued for 2 hours while introducing a gaseous mixture of ethylene and butene-1 [butene-1/ethylene=0.05 (molar ratio)] continuously to maintain the total pressure at 9 $kgf/cm^2G$.

After completion of the polymerization, surplus gaseous mixture was discharged, followed by cooling, and the contents were withdrawn to afford 42 g of a white polymer. Catalytic efficiency was 84 kg/g.Zr. The polymer was found to have a melt index (MI) of 0.9 g/10 min, Mw/Mn 3.9, density 0.9219 $g/cm^3$ and bulk density 0.46 $g/cm^3$. The heat-sealing temperature after formation of the polymer into film was 110° C., and the haze value was 44%. The activity (differential activity) in 10 minutes after the start of polymerization was 8 g/g catalyst·pressure·h and thus the initial activity at an erarly stage of the polymerization was high.

Example 2

(1) Preparation of Catalyst 20 ml of purified toluene was fed in a nitrogen atmosphere into a three-necked 100 ml flask equipped with an electromagnetic stirrer, then 0.38 g of tetrabutoxyzirconium ($Zr(OBu)_4$) and 0.52 g of cyclopentadiene were added. After stirring at room temperature for 30 minutes, the reaction system was held at 0° C. and 2.8 g of trihexylaluminum ($AlHexyl_3$) was added dropwise over a period of 10 minutes. Thereafter, the temperature of the reaction system was raised to room temperature, and stirring was conducted at the same temperature for 2 hours. Into the resulting solution was added 50 ml of a methylaluminoxane solution in toluene (concentration: 1 mmol/ml) and stirring was performed at room temperature for 5 hours. The Zr concentration of the solution thus prepared (solution A) was 0.013 mmol/ml as Zr.

Next, 20 ml of purified toluene was charged in a nitrogen atmosphere into a three-necked 50 ml flask equipped with a stirrer, then 2 g of silica (Grade #952, surface area 300 $m^2/g$, a product of Fuji-Davison Co.) which had been calcined at 600° C. for 5 hours was added and thereafter 8.5 ml of the solution A was added. The solvent was then removed by blowing of nitrogen, leaving a powder superior in fluidity.

(2) Polymerization

A stainless steel autoclave having an internal volume of 3 liters and equipped with a stirrer was purged with nitrogen, into which was then added the solid catalyst prepared above in an amount corresponding to 0.5 mg of Zr. Thereafter, the temperature was raised to 80° C. and then a gaseous mixture of ethylene and butene-1 [butene-1/ethylene=0.25 (molar ratio)] was introduced to a total pressure of 9 $kgf/cm^2G$ to start polymerization. The polymerization was continued for 2 hours while introducing a gaseous mixture of ethylene and butene-1 [butene-1/ethylene=0.05 (molar ratio )] continuously to maintain the total pressure at 9 $kgf/cm^2G$.

After completion of the polymerization, surplus gaseous mixture was discharged, followed by cooling, and the contents were withdrawn to afford 35 g of a white polymer. Catalytic efficiency was 70 kg/g.Zr. The polymer was found to have a melt index (MI) of 2.6 g/10 min, Mw/Mn 3.8, density 0.9220 $g/cm^3$ and bulk density 0.46 $g/cm^3$. The heat-sealing temperature after formation of the polymer into film was 112° C., and the haze value was 45%.

Example 3

(1) Preparation of Catalyst 20 ml of purified toluene was fed in a nitrogen atmosphere into a three-necked 100 ml flask equipped with an electromagnetic induction stirrer, then 0.27 g of tetraethoxyzirconium ($Zr(OEt)_4$) and 0.38 g of 1,3-dimethylcyclopentadiene were added. After stirring at room temperature for 30 minutes, the reaction system was held at 0° C. and 2.0 g of triisobutylaluminum ($AliBu_3$) was added dropwise over a period of 10 minutes. Thereafter, the temperature of the reaction system was raised to room temperature, and stirring was performed at the same temperature for 2 hours. Into the resulting solution was added 50 ml of a methylaluminoxane solution in toluene (concentration: 1 mmol/ml) and stirring was conducted at room temperature for 5 hours. The Zr concentration of the solution thus prepared (solution A) was 0.013 mmol/ml as Zr.

Next, 20 ml of purified toluene was charged in a nitrogen atmosphere into a three-necked 50 ml flask equipped with a stirrer, then 2 g of silica (Grade #952, surface area 300 $m^2/g$, a product of Fuji-Davison Co.) which had been calcined at 600° C. for 5 hours was added and thereafter 8.5 ml of the solution A was added. The solvent was then removed by blowing of nitrogen, leaving a powder superior in fluidity.

(2) Polymerization

A stainless steel autoclave having an internal volume of 3 liters and equipped with a stirrer was purged with nitrogen, into which was then added the solid catalyst prepared above in an amount corresponding to 0.5 mg of Zr. Thereafter, the temperature was raised to 80° C. and then a gaseous mixture of ethylene and butene-1 [butene-1/ethylene=0.25 (molar ratio)] was introduced to a total pressure of 9 $kgf/cm^2G$ to start polymerization. The polymerization was continued for 2 hours while introducing a gaseous mixture of ethylene and butene-1 [butene-1/ethylene=0.05 (molar ratio)] continuously to maintain the total pressure at 9 $kgf/cm^2G$.

After completion of the polymerization, surplus gaseous mixture was discharged, followed by cooling, and the contents were withdrawn to afford 36 g of a white polymer. Catalytic efficiency was 72 kg/g.Zr. The polymer was found to have a melt index (MI) of 0.08 g/10 min, Mw/Mn 3.6, density 0.9198 g/cm$^3$ and bulk density 0.44 g/cm$^3$. The heat-sealing temperature after formation of the polymer into film was 106° C., and the haze value was 42%.

Example 5

(1) Preparation of Catalyst 20 ml of purified toluene was fed in a nitrogen atmosphere into a three-necked 100 ml flask equipped with an electromagnetic induction stirrer, then 0.3 g of tripropoxychlorozirconium (Zr(OPr)$_3$Cl) and 0.4 g of cyclopentadiene were added, and stirring was performed at room temperature for 30 minutes to prepare a solution (solution A).

Next, 0.6 g of butyllithium and 50 ml of a methylaluminoxane solution in toluene (concentration: 1 mmol/ml) were charged in a nitrogen atmosphere into a three-necked 50 ml flask equipped with a stirrer, and stirring was conducted at room temperature for 1 hours. The resulting solution was added into the solution A prepared above to give a solution B. The Zr concentration of the solution B was 0.014 mmol/ml as Zr.

Next, 10 g of a linear low-density polyethylene (MI 1.0 g/10 min, density 0.9210 g/cm$^3$, bulk density 0.41 g/cm$^3$, particle diameter 500 μm) was placed in a nitrogen atmosphere into a three-necked 50 ml flask equipped with a stirrer, into which was then dispersed 10 ml of the solution A prepared above. Subsequently, the solvent was removed by blowing of nitrogen, leaving a powder as catalyst.

(2) Polymerization

A stainless steel autoclave having an internal volume of 3 liters and equipped with a stirrer was purged with nitrogen and then charged with the solid catalyst prepared above in an amount corresponding to 0.5 mg of Zr. Thereafter, the temperature was raised to 80° C. and then a gaseous mixture of ethylene and butene-1 [butene-1/ethylene=0.25 (molar ratio)] was introduced to a total pressure of 9 kgf/cm$^2$G to start polymerization. The polymerization was continued for 2 hours while introducing a gaseous mixture of ethylene and butene-1 [butene-1/ethylene=0.05 (molar ratio)] continuously to maintain the total pressure at 9 kgf/cm$^2$G.

Thereafter, surplus gaseous mixture was discharged, followed by cooling, and the contents were withdrawn to afford 30 g of a white polymer. Catalytic efficiency was 60 kg/g.Zr. The polymer was found to have a melt index (MI) of 5.1 g/10 min, Mw/Mn 4.2, density 0.9251 g/cm$^3$ and bulk density 0.43 g/cm$^3$. The heat-sealing temperature after formation of the polymer into film was 115° C., and the haze value was 48%.

Example 6

(1) Preparation of Catalyst 20 ml of purified toluene was fed in a nitrogen atmosphere into a three-necked 100 ml flask equipped with an electromagnetic induction stirrer, then 0.23 g of zirconium tetrachloride (ZrCl$_4$) and 0.93 g of indene were added, and stirring was performed at room temperature for 30 minutes. Thereafter, the reaction system was held at 0° C. and 1.6 g of triisobutylaluminum (AliBu$_3$) was added dropwise over a 10 minute period. After subsequent stirring at room temperature for 2 hour, 50 ml of a methylaluminoxane solution in toluene (concentration: 1 mmol/ml) was added and stirring was conducted at room temperature for 5 hours. The Zr concentration of the solution (solution A) was 0.014 mmol/ml as Zr.

Next, 20 ml of purified toluene was charged in a nitrogen atmosphere into a three-necked 50 ml flask equipped with a stirrer, into which was then added 2 g of silica (Grade #952, surface area 300 m$^2$/g, a product of Fuji-Davison Co.) which had been calcined at 600° C. for 5 hours, and subsequently added 16 ml of the solution A prepared above, followed by stirring at 40° C. for 3 hours. The solvent was then removed by blowing of nitrogen, leaving a powder superior in fluidity.

(2) Polymerization

A stainless steel autoclave having an internal volume of 3 liters and equipped with a stirrer was purged with nitrogen and then charged with the solid catalyst prepared above in an amount corresponding to 0.5 mg of Zr. Thereafter, the temperature was raised to 80° C. and a gaseous mixture of ethylene and butene-1 [butene-1/ethylene=0.25 (molar ratio)] was introduced to a total pressure of 9 kgf/cm$^2$G to start polymerization. The polymerization was continued for 2 hours while introducing a gaseous mixture of ethylene and butene-1 [butene-1/ethylene=0.05 (molar ratio)] continuously to maintain the total pressure at 9 kgf/cm$^2$G.

Thereafter, surplus gaseous mixture was discharged, followed by cooling, and the contents were withdrawn to afford 34 g of a white polymer. Catalytic efficiency was 68 kg/g.Zr. The polymer was found to have a melt index (MI) of 52 g/10 min, Mw/Mn 4.3, density 0.9231 g/cm$^3$ and bulk density 0.43 g/cm$^3$. The heat-sealing temperature after formation of the polymer into film was 114° C., and the haze value was 47%.

Example 7

(1) Preparation of Catalyst 20 ml of purified toluene was fed in a nitrogen atmosphere into a three-necked 100 ml flask equipped with an electromagnetic induction stirrer, then 0.34 g of tetrabutoxyethane (Ti(OBu)$_4$) and 0.26 g of cyclopentadiene were added, and stirring was performed at room temperature for 30 minutes. Thereafter, 1.1 g of triethylaluminum (AlEt$_3$) was added dropwise, followed by stirring at room temperature for 5 hours. Further, 100 ml of a methylaluminoxane solution in toluene (concentration: 1 mmol/ml) was added and stirring was conducted for 5 hours. The Ti concentration of the resulting solution (solution A) was 0.008 mmol/ml as Ti.

Next, 20 ml of purified toluene was charged in a nitrogen atmosphere into a three-necked 50 ml flask equipped with a stirrer, into which was then 2 g of silica (Grade #952, surface area 300 m$^2$/g, a product of Fuji-Davison Co.) which had been calcined at 600° C. for 5 hours, and subsequently added 26 ml of the solution A prepared above, followed by stirring at 40° C. for 3 hours. The solvent was then removed by blowing of nitrogen, leaving a powder superior in fluidity.

(2) Polymerization

A stainless steel autoclave having an internal volume of 3 liters and equipped with a stirrer was purged with nitrogen and then charged with the solid catalyst prepared above in an amount corresponding to 0.5 mg of Zr. Thereafter, the temperature was raised to 80° C. and a gaseous mixture of ethylene and butene-1 [butene-1/ethylene=0.25 (molar ratio)] was introduced to a total pressure of 9 kgf/cm$^2$G to start polymerization. The polymerization was continued for 2 hours while introducing a gaseous mixture of ethylene and butene-1 [butene-1/ethylene=0.05 (molar ratio)] continuously to maintain the total pressure at 9 kgf/cm$^2$G.

Thereafter, surplus gas was discharged, followed by cooling, and the contents were withdrawn to yield 34 g of a white polymer. Catalytic efficiency was 68 kg/g.Zr. The polymer was found to have a melt index (MI) of 1.9 g/10 min, Mw/Mn 3.7, density 0.9211 g/cm$^3$ and bulk density 0.45 g/cm$^3$. The heat-sealing temperature after formation of the polymer into film was 101° C., and the haze value was 44%.

Example 8

(1) Preparation of Catalyst 20 ml of purified toluene was fed in a nitrogen atmosphere into a three-necked 100 ml flask equipped with an electromagnetic induction stirrer, then 0.27 g of tetrabenzylzirconium (ZrBz$_4$) and 50 ml of a methylaluminoxane solution in toluene (concentration: 1 mmol/ml) were added, and stirring was performed at room temperature for 5 hours. Into the resulting solution was then added a mixed solution of 0.86 g trimethylcyclopentadiene and 4 ml diethylaluminum chloride (a 2 mmol/ml solution), and stirring was conducted at room temperature for 5 hours. The Zr concentration of the solution thus prepared (solution A) was 0.014 mmol/ml.

Next, 20 ml of purified toluene was charged in a nitrogen atmosphere into a three-necked 50 ml flask equipped with a stirrer, into which was then added 2 g of silica (Grade #952, surface area 300 m$^2$/g, a product of Fuji-Davison Co.) which had been calcined at 600° C. for 5 hours, and subsequently added 7.8 ml of the solution A prepared above, followed by stirring at 40° C. for 3 hours. The solvent was then removed by blowing of nitrogen, leaving a powder superior in fluidity.

(2) Polymerization

A stainless steel autoclave having an internal volume of 3 liters and equipped with a stirrer was purged with nitrogen and then charged with the solid catalyst prepared above in an amount corresponding to 0.5 mg of Zr. Thereafter, the temperature was raised to 80° C. and then a gaseous mixture of ethylene and butene-1 [butene-1/ethylene=0.25 (molar ratio)] was introduced to a total pressure of 9 kgf/cm$^2$G to start polymerization. The polymerization was continued for 2 hours while introducing a gaseous mixture of ethylene and butene-1 [butene-1/ethylene=0.05 (molar ratio)] continuously to maintain the total pressure at 9 kgf/cm$^2$G.

Thereafter, surplus gaseous mixture was discharged, followed by cooling, and the contents were withdrawn to yield 34 g of a white polymer. Catalytic efficiency was 68 kg/g.Zr. The polymer was found to have a melt index (MI) of 1.3 g/10 min, Mw/Mn 3.7, density 0.9185 g/cm$^3$ and bulk density 0.45 g/cm$^3$. The heat-sealing temperature after formation of the polymer into film was 108° C., and the haze value was 45%.

Example 9

(1) Preparation of Catalyst 150 ml of purified toluene was fed in a nitrogen atmosphere into a three-necked 300 ml flask equipped with an electromagnetic induction stirrer, into which were then added 3.3 g of tetrapropoxyzirconium (Zr(On—Pr)$_4$) and 9.3 g of indene. After stirring at room temperature for 30 minutes, the reaction system was held at 0° C. and 11.1 g of triethylaluminum (AlEt$_3$) was added dropwise over a 30 minute period. Thereafter, the temperature of the reaction system was raised to room temperature and stirring was performed for 5 hours. The Zr concentration of the resulting solution (solution A) was 0.057 mmol/ml as Zr.

Next, 10 ml of purified toluene was charged in a nitrogen atmosphere into a three-necked 100 ml flask equipped with a stirrer, into which was then added 4.8 ml of the solution A prepared above and subsequently added 27.4 ml of a methylaluminoxane solution in toluene (concentration: 1 mmol/ml), allowing reaction to take place, to prepare a solution B.

Next, 20 ml of purified toluene was fed in a nitrogen atmosphere into a three-necked 100 ml flask equipped with a stirrer, into which was then added 5 g of silica (Grade #952, surface area 300 m$^2$/g, a product of Fuji-Davison Co.) which had been calcined at 600° C. for 5 hours, and subsequently added the whole quantity of the solution B prepared above, followed by stirring at room temperature for 2 hours. The solvent was then removed by blowing of nitrogen, leaving a powder superior in fluidity.

(2) Polymerization

A stainless steel autoclave having an internal volume of 3 liters and equipped with a stirrer was purged with nitrogen and then charged with the solid catalyst prepared above in an amount corresponding to 0.5 mg of Zr. Thereafter, the temperature was raised to 80° C. and then ethylene was introduced to a total pressure of 9 kgf/cm$^2$G to start polymerization. The polymerization was continued for 1 hours while introducing ethylene continuously to maintain the total pressure at 9 kgf/cm$^2$G.

Thereafter surplus gas was discharged, followed by cooling, and the contents were withdrawn to yield 26 g of a white polymer. Catalytic efficiency was 52 kg/g.Zr. The polymer was found to have a melt index (MI) of 0.6 g/10 min, Mw/Mn 3.7, density 0.9473 g/cm$^3$ and bulk density 0.46 g/cm$^3$.

Example 10

(1) Preparation of Catalyst 150 ml of purified toluene was fed in a nitrogen atmosphere into a three-necked 300 ml flask equipped with an electromagnetic induction stirrer, into which were then added 3.3 g of tetrapropoxyzirconium (Zr(On—Pr)$_4$) and 10.3 g of bisindenylethane. After stirring at room temperature for 30 minutes, the reaction system was held at 0° C. and 11.1 g of triethylaluminum (AlEt$_3$) was added dropwise over a 30 minute period. Thereafter, the temperature of the reaction system was raised to room temperature and stirring was performed for 5 hours. The Zr concentration of the resulting solution (solution A) was 0.057 mmol/ml as Zr.

Next, 10 ml of purified toluene was charged in a nitrogen atmosphere into a three-necked 100 ml flask equipped with a stirrer, into which was then added 4.8 ml of the solution A prepared above and subsequently added 27.4 ml of a methylaluminoxane solution in toluene (concentration: 1 mmol/ml), allowing reaction to take place. The resulting solution is here designated solution B.

Next, 20 ml of purified toluene was fed in a nitrogen atmosphere into a three-necked 100 ml flask equipped with a stirrer, into which was then added 5 g of silica (Grade #952, surface area 300 m$^2$/g, a product of Fuji-Davison Co.) which had been calcined at 600° C. for 5 hours, and subsequently added the whole quantity of the solution B prepared above, followed by stirring at room temperature for 2 hours. The solvent was then removed by blowing of nitrogen, leaving a powder superior in fluidity.

(2) Polymerization

A stainless steel autoclave having an internal volume of 3 liters and equipped with a stirrer was purged with nitrogen, into which were then added 1 liter of purified toluene and the solid catalyst prepared above in an amount corresponding to 0.5 mg of Zr. Thereafter, the temperature was raised to 20° C. and propylene was introduced to a total pressure of 4 kgf/cm$^2$G to start polymerization. The polymerization was continued for 2 hours while introducing propylene continuously to maintain the total pressure at 4 kgf/cm$^2$G.

Thereafter, surplus gas was discharged, followed by cooling, and the contents were withdrawn to yield 22 g of a white polymer. Catalytic efficiency was 44 kg/g.Zr. The polymer was found to have a melting point of 139.9° C., bulk density 0.46 g/cm$^3$ and Mw/Mn 3.1.

Example 11
(1) Preparation of Transition Metal Catalyst Component 150 ml of purified toluene was fed in a nitrogen atmosphere into a three-necked 300 ml flask equipped with an electromagnetic induction stirrer, then 4.1 g of Hf(On—Pr)$_4$ and 2.6 g of cyclopentadiene were added. After stirring at room temperature for 30 minutes, the reaction system was held at 0° C. and 5.8 g of AlMe$_3$ was added dropwise over a 30 minute period. Thereafter, the temperature of the reaction system was raised to room temperature and stirring was performed for 5 hours. The Hf concentration of the resulting solution (solution A) was 0.063 mmol/ml.

Next, 10 ml of purified toluene, 4.8 ml of the solution (A) prepared above and subsequently 30 ml of a methylaluminoxane solution in toluene (concentration: 1 mmol/ml) were charged in a nitrogen atmosphere into a three-necked 100 ml flask equipped with a stirrer, and reaction to take place. The resulting solution is here designated solution B.

(2) Preparation of Solid Catalyst Component 20 ml of purified toluene was fed in a nitrogen atmosphere into a three-necked 100 ml flask equipped with a stirrer, into which was then added 5 g of SiO$_2$ (Grade #952, surface area 300 m$^2$/g, a product of Fuji-Davison Co.) which had been calcined at 600° C. for 5 hours, and subsequently added the whole quantity of the solution (B) of the transition metal catalyst component prepared above in (1), followed by stirring at room temperature for 2 hours. The solvent was then removed by blowing of nitrogen, leaving a powder superior in fluidity.

(3) Polymerization

A stainless steel autoclave having an internal volume of 3 liters and equipped with a stirrer was purged with nitrogen and charged with the solid catalyst component prepared above in an amount corresponding to 0.5 mg of Hf. Thereafter, the temperature of the reaction system was raised to 80° C. and then a gaseous mixture of ethylene and butene-1 (butene-1/ethylene mol ratio=0.25) was introduced to a total pressure of 9 kgf/cm$^2$G to start polymerization. The polymerization was continued for 2 hours while introducing a gaseous mixture of ethylene and butene-1 (butene-1/ethylene mol ratio=0.05) continuously to maintain the total pressure at 9 kgf/cm$^2$G.

Thereafter, surplus gaseous mixture was discharged, followed by cooling, and the contents were withdrawn to yield 12 g of a white polymer. Catalytic efficiency was 24 kg/g.Hf. The polymer was found to have an MI of 0.1 g/10 min, Mw/Mn 3.2, density 0.9212 g/cm$^3$ and bulk density 0.45 g/cm$^3$. The heat-sealing temperature after formation of the polymer into film was 111° C., and the haze value was 45%.

Example 12
(1) Preparation of Transition Metal Catalyst Component 20 ml of purified toluene was fed in a nitrogen atmosphere into a three-necked 100 ml flask equipped with an electromagnetic induction stirrer, into which were then added 0.41 g of Zr(C$_6$H$_5$CH$_2$)$_3$(OEt) and 0.23 g of indene. After stirring at room temperature for 30 minutes, the reaction system was held at 0° C. and 1.1 g of (AlEt$_3$) was added dropwise. Thereafter, the temperature of the reaction system was raised to room temperature and stirring was performed for 2 hours. Subsequently 50 ml of a methylaluminoxane solution in toluene (concentration: 1 mmol/ml) was added and stirring was conducted at room temperature for 5 hours.

(2) Preparation of Solid Catalyst Component 20 ml of purified toluene was fed in a nitrogen atmosphere into a three-necked 50 ml flask equipped with a stirrer, into which was then added 2 g of SiO$_2$ (Grade #952, surface area 300 m$^2$/g, a product of Fuji-Davison Co.) which had been calcined at 600° C. for 5 hours, and subsequently added 8.5 ml of the transition metal catalyst component prepared above in (1). After stirring at 40° C. for 3 hours, the solvent was removed by blowing of nitrogen, leaving a powder superior in fluidity.

(3) Polymerization

Polymerization was carried out in the same way as in Example 1. The yield of the resulting polymer was 37 g. Catalytic efficiency was 74 kg/g.Zr. The polymer was found to have an (MI) of 2.5 g/10 min, Mw/Mn 3.7, density 0.9187 g/cm$^3$ and bulk density 0.46 g/cm$^3$. The heat-sealing temperature after formation of the polymer into film was 107° C., and the haze value was 45%.

Example 13
(1) Preparation of Transition Metal Catalyst Component 20 ml of purified toluene was fed in a nitrogen atmosphere into a three-necked 100 ml flask equipped with an electromagnetic stirrer, into which were then added 0.38 g of Zr(OBu)4 and 0.26 g of cyclopentadiene. After stirring at room temperature for 30 minutes, the reaction system was held at 0° C. and 0.45 g of EtBuMg was added. Thereafter, the temperature of the reaction system was raised to room temperature and stirring was performed for 2 hours, then 50 ml of a methylaluminoxane solution in toluene (concentration: 1 mmol/ml) was added, followed by stirring at room temperature for 5 hours to prepare a solution of a transition metal catalyst component. The Zr concentration of the solution was 0.014 mmol/ml.

(2) Preparation of Solid Catalyst Component 20 ml of purified toluene was fed in a nitrogen atmosphere into a three-necked 50 ml flask equipped with a stirre, into which was then added 2 g of alumina (surface area 300 m$^2$/g, a product of Catalysts & Chemicals Industries Co.) which had been calcined at 400° C. for 5 hours, and subsequently added 12.5 ml of the transition metal catalyst component prepared above in (1). After stirring at 40° C. for 5 hours, the solvent was removed by blowing of nitrogen, leaving a powder superior in fluidity.

(3) Polymerization

Polymerization was carried out in the same way as in Example 1. The yield of the resulting polymer was 27 g. Catalytic efficiency was 54 kg/g.Zr. The polymer was found to have an (MI) of 5.3 g/10 min, Mw/Mn 4.6, density 0.9223 g/cm$^3$ and bulk density 0.41 g/cm$^3$. The heat-sealing temperature after formation of the polymer into film was 113° C., and the haze value was 48%.

Example 14
(1) Preparation of Transition Metal Catalyst Component 20 ml of purified toluene was fed in a nitrogen atmosphere into a three-necked 100 ml flask equipped with an electromagnetic induction stirrer, into which were then added 0.33 g of Zr(OPr)4 and 0.26 g of cyclopentadiene, and subsequently added 0.78 g of BEt$_3$. Thereafter, 100 ml of a methylaluminoxane solution in toluene (concentration: 1 mmol/ml) was added and stirring was performed for 5 hours to prepare a solution of a transition metal catalyst component. The Zr concentration of this solution was 0.008 mmol/ml.

(2) Preparation of Solid Catalyst Component 20 ml of purified toluene was fed in a nitrogen atmosphere into a three-necked 50 ml flask equipped with a stirre, into which was then added 2 g of SiO$_2$ (Grade #952, surface area 300 m$^2$/g, a product of Fuji-Davison Co.) which had been calcined at 600° C. for 5 hours, and subsequently added 16.5 ml of the transition metal catalyst component prepared above in (1). After stirring at 40° C. for 3 hours, the solvent was removed by blowing of nitrogen, leaving a powder superior in fluidity.

(3) Polymerization

Polymerization was carried out in the same way as in Example 1. The yield of the resulting polymer was 31 g. Catalytic efficiency was 62 kg/g.Zr. The polymer was found to have an (MI) of 4.3 g/10 min, Mw/Mn 4.2, density 0.9256 g/cm$^3$ and bulk density 0.43 g/cm$^3$. The heat-sealing temperature after formation of the polymer into film was 116° C., and the haze value was 47%.

Example 15

(1) Preparation of Transition Metal Catalyst Component 20 ml of purified toluene was fed in a nitrogen atmosphere into a three-necked 100 ml flask equipped with an electromagnetic induction stirrer, into which were then added 0.3 g of Zr(OEt)$_4$ and 0.6 g of monocyclopentadienyl-trimethylsilane, followed by stirring at room temperature for 30 minutes. Separately, 2 g of diethylaluminum monoethoxide and 50 ml of a methylaluminoxane solution in toluene (concentration: 1 mmol/ml) were charged in a nitrogen atmosphere into a three-necked 100 ml flask equipped with an electromagnetic induction stirrer, and stirring was performed at room temperature for 1 hour. Thereafter, the resulting solution was added into the solution containing Zr(OEt)$_4$ and monocyclopentadienyl-trimethylsilane, to prepare a solution of a transition metal catalyst component. The Zr concentration of this solution was 0.014 mmol/ml.

(2) Preparation of Solid Catalyst Component 20 ml of purified toluene was fed in a nitrogen atmosphere into a three-necked 50 ml flask equipped with a stirrer, into which was then added 2 g of SiO$_2$ (Grade #952, surface area 300 m$^2$/g, a product of Fuji-Davison Co.) which had been calcined at 600° C. for 5 hours, and subsequently added 6.3 ml of the transition metal catalyst component prepared above in (1). After stirring at 40° C. for 3 hours, the solvent was removed by blowing of nitrogen, leaving a powder superior in fluidity.

(3) Polymerization

Polymerization was carried out in the same way as in Example 1. The yield of the resulting polymer was 43 g. Catalytic efficiency was 86 kg/g.Zr. The polymer was found to have an (MI) of 1.6 g/10 min, Mw/Mn 4.5, density 0.9199 g/cm$^3$ and bulk density 0.46 g/cm$^3$. The heat-sealing temperature after formation of the polymer into film was 109° C., and the haze value was 44%.

Comparative Example 1

(1) Preparation of Catalyst 150 ml of purified toluene was fed in a nitrogen atmosphere into a three-necked 300 ml flask equipped with an electromagnetic induction stirrer, into which were then added 3.3 g of tetrapropoxyzirconium (Zr(On—Pr)$_4$) and 9.3 g of indene. After stirring at room temperature for 30 minutes, the reaction system was held at 0° C. and 11.1 g of triethylaluminum (AlEt$_3$) was added dropwise over a 30 minute period. Thereafter, the temperature of the reaction system was raised to room temperature and stirring was performed for 5 hours. The resulting solution is here designated solution A. The Zr concentration of the solution A was 0.057 mmol/ml.

Next, 20 ml of purified toluene was charged in a nitrogen atmosphere into a three-necked 50 ml flask equipped with a stirrer, into which was then added 2 g of Silica (Grade #952, surface area 300 m$^2$/g, a product of Fuji-Davison Co.) which had been calcined at 600° C. for 5 hours, and subsequently added 23 ml of a methylaluminoxane solution in toluene (concentration: 1 mmol/ml), followed by stirring at room temperature for 2 hours. Into the resulting solution was then added 1.9 ml of the solution A and stirring was conducted at 40° C. for 3 hours. Thereafter, the solvent was removed by blowing of nitrogen, leaving a powder superior in fluidity.

(2) Polymerization

A stainless steel autoclave having an internal volume of 3 liters and equipped with a stirrer was purged with nitrogen and charged with the solid catalyst component prepared above in an amount corresponding to 0.5 mg of Zr. Thereafter, the temperature was raised to 80° C. and then a gaseous mixture of ethylene and butene-1 [butene-1/ethylene=0.25 (molar ratio)] was introduced to a total pressure of 9 kgf/cm$^2$G to start polymerization. The polymerization was continued for 2 hours while introducing a gaseous mixture of ethylene and butene-1 [(butene-1/ethylene=0.05 (molar ratio)] continuously to maintain the total pressure at 9 kgf/cm$^2$G.

Thereafter, surplus gaseous mixture was discharged, followed by cooling, and the contents were withdrawn to yield 26 g of a white polymer. Catalytic eficiency was 53 kg/g.Zr. The polymer was found to have a melt index (MI) of 0.6 g/10 min, Mw/Mn 5.1, density 0.9226 g/cm$^3$ and bulk density 0.41 g/cm$^3$. The heat-sealing temperature after formation of the polymer into film was 112° C., and the haze value was 48%. The activity (differential activity) in 10 minutes after the start of polymerization was 4 g/g catalyst.pressure.h and thus the initial activity at an early stage of the polymerization was lower than that in Example 1.

What is claimed is:

1. An olefm polymerization catalyst, said catalyst being prepared by contacting the following constituents (1) to (4) with one another:

(1) a compound represented by the general formula Me$^1$R$^1_p$(OR$^2$)$_q$X$^1_{4-p-q}$, where Me$^1$ is Zr, Ti or Hf, R$^1$ and R$^2$ are each independently a hydrocarbon group having 1 to 24 carbon atoms, X$^1$ is a halogen atom, p and q are each an integer in the ranges of $0 \leq p \leq 4$ and $0 \leq q \leq 4$, provided $0 \leq p+q \leq 4$;

(2) a compound represented by the general formula Me$^2$R$^3_m$(OR$^4$)$_n$X$^2_{z-m-n}$, where Me$^2$ is a Group I–III element in the Periodic Table, R$^3$ and R$^4$ are each independently a hydrocarbon group having 1 to 24 carbon atoms, X$^2$ is a halogen atom or a hydrogen atom, provided when X$^2$ is a hydrogen atom, Me$^2$ is a Group III element in the Periodic Table, z is the valance of Me$^2$, m and n are each an integer in the ranges of $0 \leq m \leq z$ and $0 \leq n \leq z$, provided $0 \leq m+n \leq z$;

(3) an organocyclic compound having conjugated double bonds; and (4) an aluminoxane obtained by reacting trialkylaluminum and water, and thereafter contacting the resulting contact reaction product with the following component (5);

(5) in inorganic carrier and/or a particulate polymer carrier.

2. A catalyst as set forth in claim 1, wherein Me$^2$ in the constituent (2) is lithium, sodium, potassium, magnesium, calcium, zinc, boron and aluminum.

3. A catalyst as set forth in claim 1, wherein the constituent (3) is a cyclic hydrocarbon having at least one ring which contains 2 to 4 conjugated double bonds and having 4 to 24 carbon atoms in all.

4. A catalyst component as set forth in claim 3, wherein the cyclic hydrocarbon is a compound represented by the following general formula:

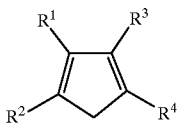

Where $R^1$, $R^2$, $R^3$ and $R^4$ are each independently a hydrogen or hydrocarbon group, two of which may conjointly form a cyclic hydrocarbon group.

5. A catalyst as set forth in claim 4, wherein the constituent (3) is a compound represented by the following general formula:

where A is a cyclic hydrocarbon group, R is hydrogen or a halocarbon residue having 1 to 24 carbon atoms, and L is an integer in the range of $1 \leq L \leq 4$.

6. A catalyst as set forth in claim 1, wherein the constituent (4) is a compound having 1 to 100 Al—O—Al bonds in the molecule thereof prepared by the reaction of an organoaluminum compound and water.

7. A catalyst as set forth in claim 1, wherein the proportion ratio of the constituent (2) to 1 mole of the constituent (1) is in the range of 0.01 to 100 moles.

8. A catalyst as set forth in claim 1, wherein the proportion ratio of the constituent (3) to 1 mole of the constituent (1) is in the range of 0.01 to 100 moles.

9. A catalyst as set forth in claim 1, wherein the proportion ratio of the constituent (3) to 1 mole of the constituent (1) is in the range of 0.01 to 50 moles.

10. A catalyst as set forth in claim 1, wherein the proportion ratio of the constituent (4) to 1 mole of the constituent (1) is in the range of 1 to 10,000 moles.

11. A catalyst as set forth in claim 1, wherein the proportion ratio of the transition metal in Me constituent (1) to 1 g of the constituent (5) is in the range of 0.01 to 10 wt %.

12. A process for preparing a polyolefin which comprises homopolymerizing or copolymerizing one or more olefins in the presence of the catalyst as defined in claim 1.

13. A method of making a polymerization catalyst which comprises contacting the following constituents (1) to (4) with one another:

(1) a compound represented by the general formula $Me^1R^1_p(OR^2)_qX^1_{4-p-q}$, where $Me^1$ is Zr, Ti or Hf, $R^1$ and $R^2$ are each independently a hydrocarbon group having 1 to 24 carbon atoms, $X^1$ is a halogen atom, p and q are each an integer in the ranges of $0 \leq p \leq 4$ and $0 \leq q \leq 4$, provided $0 \leq p+q \leq 4$;

(2) a compound represented by the general formula $Me^2R^3_m(OR^4)_nX^2_{z-m-n}$, where $Me^2$ is a Group I–III element in the Periodic Table, $R^3$ and $R^4$ are each independently a hydrocarbon group having 1 to 24 carbon atoms, $X^2$ is a halogen atom or a hydrogen atom, provided when $X^2$ is a hydrogen atom, $Me^2$ is a Group III element in the Periodic Table, z is the valance of $Me^2$, m and n are each an integer in the ranges of $0 \leq m \leq z$ and $0 \leq n \leq z$, provided $0 \leq m+n \leq z$;

(3) an organocyclic compound having conjugated double bonds; and (4) an aluminoxane obtained by reacting trialkylaluminum and water, and thereafter contacting the resulting contact reaction product with the following component (5);

(5) in inorganic carrier and/or a particulate polymer carrier.

14. The method of claim 13 wherein $Me^2$ in the constituent (2) is lithium, sodium, potassium, magnesium, calcium, zinc, boron and aluminum.

15. The method of claim 13 wherein the constituent (3) is a cyclic hydrocarbon having at least one ring which contains 2 to 4 conjugated double bonds and having 4 to 24 carbon atoms in all.

16. The method of claim 13 wherein the cyclic hydrocarbon is a compound represented by the following general formula:

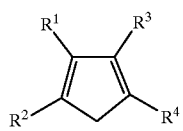

where $R^1$, $R^2$, $R^3$ and $R^4$ are each independently a hydrogen or hydrocarbon group, two of which may conjointly form a cyclic hydrocarbon group.

17. The method of claim 16 wherein the constituent (3) is a compound represented by the following general formula:

where A is a cyclic hydrocarbon group, R is hydrogen or a halocarbon residue having 1 to 24 carbon atoms, and L is an integer in the range of $1 \leq L \leq 4$.

18. The method of claim 13 wherein the constituent (4) is a compound having 1 to 100 Al—O—Al bonds in the molecule thereof prepared by the reaction of an organoaluminum compound and water.

19. The method of claim 13 wherein the proportion ratio of the constituent (2) to 1 mole of the constituent (1) is in the range of 0.01 to 100 moles.

20. The method of claim 13 wherein the proportion ratio of the constituent (3) to 1 mole of the constituent (1) is in the range of 0.01 to 100 moles.

21. The method of claim 13 wherein the proportion ratio of the constituent (3) to 1 mole of the constituent (1) is in the range of 0.01 to 50 moles.

22. The method of claim 13 wherein the proportion ratio of the constituent (4) to 1 mole of the constituent (1) is in the range of 1 to 10,000 moles.

23. The method of claim 13 wherein the proportion ratio of the transition metal in $Me^1$ constituent (1) to 1 g of the constituent (5) is in the range of 0.01 to 10 wt %.

* * * * *